United States Patent
Choi et al.

(10) Patent No.: US 10,142,739 B2
(45) Date of Patent: Nov. 27, 2018

(54) PANEL VIBRATION TYPE DISPLAY DEVICE FOR GENERATING SOUND

(71) Applicant: LG DISPLAY CO., LTD., Seoul (KR)

(72) Inventors: YeongRak Choi, Gyeonggi-do (KR); KwanHo Park, Incheon (KR); Sungtae Lee, Incheon (KR); Kwangho Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/471,431

(22) Filed: Mar. 28, 2017

(65) Prior Publication Data

US 2017/0280246 A1    Sep. 28, 2017

(30) Foreign Application Priority Data

Mar. 28, 2016  (KR) .......................... 10-2016-0037118
Apr. 4, 2016    (KR) .......................... 10-2016-0040885
(Continued)

(51) Int. Cl.
*H04R 5/02*         (2006.01)
*H04R 9/06*         (2006.01)
(Continued)

(52) U.S. Cl.
CPC ............. *H04R 9/066* (2013.01); *H04N 5/642* (2013.01); *H04R 1/025* (2013.01); *H04R 1/028* (2013.01);
(Continued)

(58) Field of Classification Search
CPC ................ H04R 3/002; H04R 2499/11; H04R 2499/15; H04R 1/323; H04R 1/028;
(Continued)

(56) References Cited

U.S. PATENT DOCUMENTS 4,891,842 A * 1/1990 Green ..................... H04R 1/025
                                              181/150
5,025,474 A * 6/1991 Tanaka ................. G03B 21/565
                                              181/148
(Continued)

FOREIGN PATENT DOCUMENTS

CN       1547416 A     11/2004
CN      102946577 A     2/2013
(Continued)

OTHER PUBLICATIONS

Communication dated Jun. 30, 2017 from the European Patent Office in related European application No. 16181195.5.
(Continued)

*Primary Examiner* — Leshui Zhang
(74) *Attorney, Agent, or Firm* — Morgan, Lewis & Bockius LLP

(57) ABSTRACT

The present embodiments relates to a display panel configured to display images, a plurality of sound generating actuators in a plurality of sound output areas, the sound generating actuators configured to vibrate the display panel to generate sound, and a partition that is between each of the plurality of sound output areas and surrounds at least one of the plurality of sound output areas.

30 Claims, 23 Drawing Sheets

(30) Foreign Application Priority Data

| Apr. 5, 2016 | (KR) | ........................ | 10-2016-0041384 |
| May 30, 2016 | (KR) | ........................ | 10-2016-0066455 |
| May 31, 2016 | (KR) | ........................ | 10-2016-0067431 |
| Jun. 30, 2016 | (KR) | ........................ | 10-2016-0083122 |
| Nov. 30, 2016 | (KR) | ........................ | 10-2016-0161789 |
| Nov. 30, 2016 | (KR) | ........................ | 10-2016-0162189 |
| Dec. 30, 2016 | (KR) | ........................ | 10-2016-0183867 |

(51) Int. Cl.
  H04N 5/64    (2006.01)
  H04R 1/02    (2006.01)
  H04R 1/28    (2006.01)
  H04R 11/02   (2006.01)
  H04R 9/02    (2006.01)
  H04R 3/14    (2006.01)
  H04R 1/26    (2006.01)
  H04R 7/04    (2006.01)

(52) U.S. Cl.
  CPC ............. *H04R 1/26* (2013.01); *H04R 1/288* (2013.01); *H04R 3/14* (2013.01); *H04R 5/02* (2013.01); *H04R 7/045* (2013.01); *H04R 9/025* (2013.01); *H04R 9/06* (2013.01); *H04R 11/02* (2013.01); *H04R 5/023* (2013.01); *H04R 2307/023* (2013.01); *H04R 2307/025* (2013.01); *H04R 2400/03* (2013.01); *H04R 2440/05* (2013.01); *H04R 2499/15* (2013.01)

(58) Field of Classification Search
  CPC ............ H04R 2400/03; H04R 2440/00; H04R 2440/01; H04R 2440/03; H04R 2440/05; H04R 2440/07; G06F 1/1605; G06F 1/1652; G06F 3/041; G06F 3/016; G06F 3/0412; G06F 3/0414; G06F 2203/04102; G09G 5/00; G09G 3/3225; G09G 3/3266; G09G 3/3275; G02G 2310/08
  USPC .......... 381/332–337, 152, 339, 346–351, 87, 381/300, 301, 303–308, 61, 66, 352, 353, 381/354, 160, 162, 165, 166, 386, 388, 381/395, 191, 338, 345; 700/94; 345/173; 455/149, 350; 181/148, 150

See application file for complete search history.

(56) References Cited

U.S. PATENT DOCUMENTS

| 5,796,854 | A | 8/1998 | Markow |
| 6,137,890 | A | 10/2000 | Markow |
| 6,208,237 | B1 | 3/2001 | Saiki et al. |
| 6,238,755 | B1 | 5/2001 | Harvey et al. |
| 6,342,831 | B1 | 1/2002 | Azima |
| 6,443,586 | B1 | 9/2002 | Azima et al. |
| 6,610,237 | B2 | 8/2003 | Azima et al. |
| 6,618,487 | B1 | 9/2003 | Azima et al. |
| 6,677,384 | B1 | 1/2004 | Ikemoto et al. |
| 6,751,329 | B2 | 6/2004 | Colloms et al. |
| 6,795,561 | B1 | 9/2004 | Bank |
| 6,826,285 | B2 | 11/2004 | Azima |
| 6,871,149 | B2 | 3/2005 | Sullivan et al. |
| 6,911,901 | B2 | 6/2005 | Bown |
| 6,922,642 | B2 | 7/2005 | Sullivan |
| 6,937,124 | B1 | 8/2005 | Nakamura et al. |
| 6,985,596 | B2 | 1/2006 | Bank et al. |
| 7,020,302 | B2 | 3/2006 | Konishi et al. |
| 7,050,600 | B2 | 5/2006 | Saiki et al. |
| 7,120,264 | B2 | 10/2006 | Saiki et al. |
| 7,157,649 | B2 | 1/2007 | Hill |
| 7,158,651 | B2 | 1/2007 | Bachmann et al. |
| 7,174,025 | B2 | 2/2007 | Azima et al. |
| 7,184,898 | B2 | 2/2007 | Sullivan et al. |
| 7,215,329 | B2 | 5/2007 | Yoshikawa et al. |
| 7,305,248 | B2 | 12/2007 | Mori |
| 7,372,110 | B2 | 5/2008 | Hatano |
| 7,376,523 | B2 | 5/2008 | Sullivan et al. |
| 7,382,890 | B2 | 6/2008 | Saiki et al. |
| 7,536,211 | B2 | 5/2009 | Saiki et al. |
| 7,545,459 | B2 | 6/2009 | Fujiwara et al. |
| 7,564,984 | B2 | 7/2009 | Bank et al. |
| 7,570,771 | B2 | 8/2009 | Whitwell et al. |
| 7,593,159 | B2 | 9/2009 | Yokoyama et al. |
| 7,657,042 | B2 | 2/2010 | Miyata |
| 7,764,803 | B2 | 7/2010 | Kang |
| 7,769,191 | B2 | 8/2010 | Lee et al. |
| 7,800,702 | B2 | 9/2010 | Tsuboi et al. |
| 7,903,091 | B2 | 3/2011 | Lee et al. |
| 8,174,495 | B2 | 5/2012 | Takashima et al. |
| 8,174,511 | B2 | 5/2012 | Takenaka et al. |
| 8,180,074 | B2 | 5/2012 | Ko et al. |
| 8,194,894 | B2 | 6/2012 | Burton et al. |
| 8,274,480 | B2 | 9/2012 | Sullivan |
| 8,736,558 | B2 | 5/2014 | East et al. |
| 8,830,211 | B2 | 9/2014 | Hill |
| 8,879,766 | B1 | 11/2014 | Zhang |
| 8,917,168 | B2 | 12/2014 | Kono et al. |
| 8,934,228 | B2 | 1/2015 | Franklin et al. |
| 9,001,060 | B2 | 4/2015 | Harris |
| 9,030,447 | B2 | 5/2015 | Hsu |
| 9,035,918 | B2 | 5/2015 | Harris et al. |
| 9,041,662 | B2 | 5/2015 | Harris |
| 9,046,949 | B2 | 6/2015 | Adachi et al. |
| 9,107,006 | B2 | 8/2015 | Wang et al. |
| 9,122,011 | B2 | 9/2015 | Oh et al. |
| 9,131,301 | B2 * | 9/2015 | Tsai ..................... H04R 1/02 |
| 9,137,592 | B2 | 9/2015 | Yliaho et al. |
| 9,148,716 | B2 | 9/2015 | Liu et al. |
| 9,173,014 | B2 | 10/2015 | Park |
| 9,191,749 | B2 | 11/2015 | Nabata et al. |
| 9,197,966 | B2 | 11/2015 | Umehara et al. |
| 9,204,223 | B2 | 12/2015 | Nabata et al. |
| 9,285,882 | B2 | 3/2016 | Wang et al. |
| 9,288,564 | B2 | 3/2016 | Faerstain et al. |
| 9,300,770 | B2 | 3/2016 | Nabata et al. |
| 9,317,063 | B2 | 4/2016 | Kwon et al. |
| 9,332,098 | B2 | 5/2016 | Horii |
| 9,350,832 | B2 | 5/2016 | Horii |
| 9,357,280 | B2 | 5/2016 | Mellow et al. |
| 9,363,591 | B2 | 6/2016 | Ozasa et al. |
| 9,363,607 | B2 | 6/2016 | Ando |
| 9,380,366 | B2 | 6/2016 | Kang et al. |
| 9,389,688 | B2 | 7/2016 | Tossavainen et al. |
| 9,398,358 | B2 | 7/2016 | Louh |
| 9,436,320 | B2 | 9/2016 | Kang et al. |
| 9,544,671 | B2 | 1/2017 | Shi et al. |
| 9,609,438 | B2 | 3/2017 | Kim et al. |
| 9,654,863 | B2 | 5/2017 | Crosby et al. |
| 2001/0040976 | A1 | 11/2001 | Buos |
| 2001/0043714 | A1 | 11/2001 | Asada et al. |
| 2002/0141607 | A1 * | 10/2002 | Azima ................... H04R 7/045 381/152 |
| 2003/0233794 | A1 | 12/2003 | Pylkki et al. |
| 2005/0129258 | A1 | 6/2005 | Fincham |
| 2005/0129265 | A1 | 6/2005 | Nakajima et al. |
| 2006/0018503 | A1 | 1/2006 | Endo |
| 2006/0078153 | A1 | 4/2006 | Sato |
| 2006/0120542 | A1 | 6/2006 | Lee et al. |
| 2006/0126885 | A1 | 6/2006 | Combest |
| 2006/0140439 | A1 | 6/2006 | Nakagawa |
| 2007/0019134 | A1 | 1/2007 | Park et al. |
| 2007/0036388 | A1 | 2/2007 | Lee et al. |
| 2007/0187172 | A1 | 8/2007 | Kaneda et al. |
| 2007/0290609 | A1 | 12/2007 | Ishii et al. |
| 2009/0034174 | A1 | 2/2009 | Ko et al. |
| 2009/0034759 | A1 | 2/2009 | Ko et al. |
| 2009/0097692 | A1 | 4/2009 | Sakamoto |
| 2009/0247237 | A1 | 10/2009 | Mittleman et al. |
| 2009/0267891 | A1 | 10/2009 | Ali |
| 2012/0034541 | A1 | 2/2012 | Muraoka et al. |
| 2012/0242592 | A1 | 9/2012 | Rothkopf et al. |

(56) References Cited

U.S. PATENT DOCUMENTS

| | | | |
|---|---|---|---|
| 2012/0243719 A1* | 9/2012 | Franklin | G06F 1/1652 |
| | | | 381/333 |
| 2012/0274570 A1 | 11/2012 | Kim | |
| 2013/0089231 A1 | 4/2013 | Wilk et al. | |
| 2013/0106868 A1 | 5/2013 | Shenoy | |
| 2014/0029777 A1 | 1/2014 | Jang | |
| 2014/0049522 A1 | 2/2014 | Mathew et al. | |
| 2014/0145836 A1 | 5/2014 | Tossavainen et al. | |
| 2014/0146093 A1 | 5/2014 | Sako et al. | |
| 2014/0197380 A1 | 7/2014 | Sung et al. | |
| 2014/0326402 A1 | 11/2014 | Lee et al. | |
| 2014/0334078 A1 | 11/2014 | Lee et al. | |
| 2015/0010187 A1 | 1/2015 | Lee et al. | |
| 2015/0016658 A1 | 1/2015 | Lee | |
| 2015/0062101 A1 | 3/2015 | Kim et al. | |
| 2015/0078604 A1 | 3/2015 | Seo et al. | |
| 2015/0119834 A1 | 4/2015 | Locke et al. | |
| 2015/0138157 A1 | 5/2015 | Harris et al. | |
| 2015/0195630 A1 | 7/2015 | Yliaho et al. | |
| 2015/0341714 A1 | 11/2015 | Ahn et al. | |
| 2015/0350775 A1 | 12/2015 | Behles et al. | |
| 2016/0011442 A1 | 1/2016 | Lee et al. | |
| 2016/0050472 A1 | 2/2016 | Lee et al. | |
| 2016/0212513 A1 | 7/2016 | Honda et al. | |
| 2016/0261966 A1 | 9/2016 | Won | |
| 2017/0070811 A1 | 3/2017 | Mihelich et al. | |
| 2017/0280216 A1 | 9/2017 | Lee et al. | |

FOREIGN PATENT DOCUMENTS

| | | | |
|---|---|---|---|
| CN | 105096778 A | | 11/2015 |
| EP | 1 507 438 A2 | | 2/2005 |
| EP | 1881731 A1 | | 1/2008 |
| EP | 2947857 A2 | | 11/2015 |
| JP | 55-25284 A | | 2/1980 |
| JP | 2696801 B2 | | 1/1998 |
| JP | H11-44891 A | | 2/1999 |
| JP | 2001-61194 A | | 3/2001 |
| JP | 2002-511681 A | | 4/2002 |
| JP | 2002-264646 A | | 9/2002 |
| JP | 2003-211087 A | | 7/2003 |
| JP | 3578244 B2 | | 10/2004 |
| JP | 2004-343362 A | | 12/2004 |
| JP | 2005-175553 A | | 6/2005 |
| JP | 2005-244804 A | | 9/2005 |
| JP | 2006-138149 A | | 6/2006 |
| JP | 2006-186590 A | | 7/2006 |
| JP | 2006279284 A | * | 10/2006 |
| JP | 2006-319626 A | | 11/2006 |
| JP | 2006-325079 A | | 11/2006 |
| JP | 3896675 B2 | | 3/2007 |
| JP | 2007-267302 A | | 10/2007 |
| JP | 2007-528648 A | | 10/2007 |
| JP | 2007-300578 A | | 11/2007 |
| JP | 2009-100223 A | | 5/2009 |
| JP | 2009100223 A | | 5/2009 |
| JP | 2009-302924 A | | 12/2009 |
| JP | 2010-027845 A | | 2/2010 |
| JP | 2010-081142 A | | 4/2010 |
| JP | 4449605 B2 | | 4/2010 |
| JP | 2012-129247 A | | 7/2012 |
| JP | 2012-198407 A | | 10/2012 |
| JP | 5060443 B2 | | 10/2012 |
| JP | 2013-044912 A | | 3/2013 |
| JP | 2013-102360 A | | 5/2013 |
| JP | 2014-509028 A | | 4/2014 |
| JP | 2014-220237 A | | 11/2014 |
| JP | 2014-220802 A | | 11/2014 |
| JP | 2015-219528 A | | 12/2015 |
| KR | 10-2008-0002228 A | | 1/2008 |
| KR | 2008-0063698 A | | 7/2008 |
| KR | 10-1026987 B1 | | 4/2011 |
| KR | 10-1061519 B1 | | 9/2011 |
| KR | 10-1404119 B1 | | 6/2014 |
| KR | 101410393 B2 | | 6/2014 |
| KR | 2015-0005089 A | | 1/2015 |
| KR | 10-2015-0031641 A | | 3/2015 |
| KR | 10-1499514 B1 | | 3/2015 |
| KR | 10-2015-0131428 A | | 11/2015 |
| KR | 2015-133918 A | | 12/2015 |
| KR | 10-2017-0135673 A | | 12/2017 |
| TW | 200706049 A | | 2/2007 |
| TW | M451766 U | | 4/2013 |
| TW | 201319783 A | | 5/2013 |
| TW | 201503710 A | | 1/2015 |
| TW | 201545559 A | | 12/2015 |
| WO | 99/52322 A1 | | 10/1999 |
| WO | 2005/089014 A1 | | 9/2005 |
| WO | 2009/017280 A1 | | 2/2009 |
| WO | 2012/129247 A2 | | 9/2012 |
| WO | 2015-046288 A1 | | 4/2015 |
| WO | 2016/002230 A1 | | 1/2016 |

OTHER PUBLICATIONS

Extended European Search Report issued in European Application No. 17183078.9 dated Jan. 16, 2018.
Extended European Search Report issued in European Application No. 17184428.5 dated Jan. 23, 2018.
Extended European Search Report issued in European Application No. 17184429.3 dated Jan. 26, 2018.
Japanese Office Action issued in Japanese Application No. 2016-216426 dated Nov. 24, 2017.
Taiwanese Office Action issued in Taiwanese Application No. 10720014270 dated Jan. 10, 2018.
Taiwanese Office Action issued in Taiwanese Application No. 10621325350 dated Jan. 3, 2018.
USPTO Office Action dated Sep. 8, 2017 in related U.S. Appl. No. 15/374,566.
USPTO Office Action dated Oct. 26, 2017 in related U.S. Appl. No. 15/471,458.
USPTO Office Action dated Nov. 9, 2017 in related U.S. Appl. No. 15/471,173.
USPTO Office Action dated Aug. 10, 2017 in related U.S. Appl. No. 15/340,709.
USPTO Office Action dated Oct. 13, 2017 in related U.S. Appl. No. 15/471,184.
Hermida, Alfred, "PC Screen Turns Into Speaker," BBC News, Technology, Mar. 31, 2003, pp. 1-2.
Office Action dated Sep. 26, 2017 from the Japanese Patent Office in related Japanese application No. 2016-190615.
Office Action dated Oct. 3, 2017 from the Japanese Patent Office in related Japanese application No. 2016-235794.
Communication dated Sep. 19, 2017 from the European Patent Office in related European application No. 16181185.6.
Communication dated Sep. 5, 2017 from the European Patent Office in related European application No. 16181191.4.
Office Action dated Mar. 27, 2017, from the Korean Patent Office in related Application No. 10-2016-0146951.
Office Action dated May 31, 2017, from the Taiwanese Patent Office in counterpart Application No. 106121605.
Taiwanese Office Action dated May 15, 2018, issued in Taiwanese Application No. 106122586.
Japanese Office Action dated Jul. 3, 2018, issued in Japanese Application No. 2016-235794.
Japanese Office Action dated Jun. 5, 2018, issued in Japanese Application No. 2017-131154.
Japanese Office Action dated Aug. 23, 2018, issued in Japanese Application No. 2017-137757.
Japanese Office Action dated Aug. 23, 2018, issued in Japanese Application No. 2017-124022.
Japanese Office Action dated Sep. 25, 2018, issued in Japanese Application No. 2017-131143.

* cited by examiner

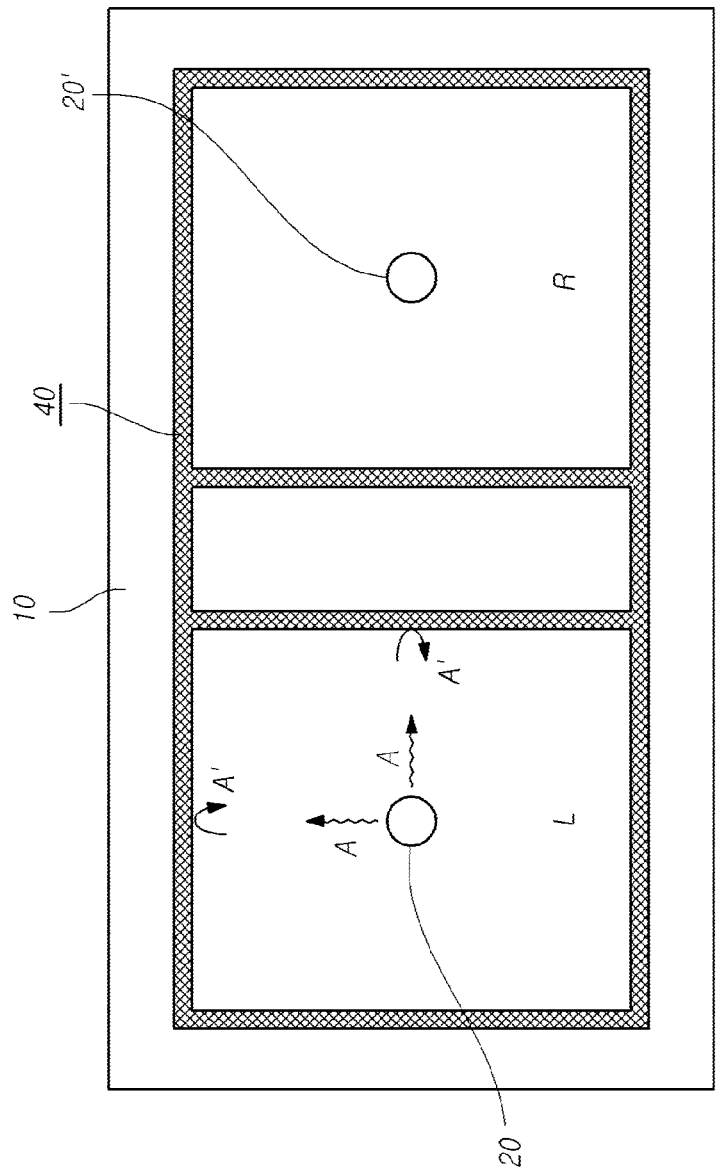

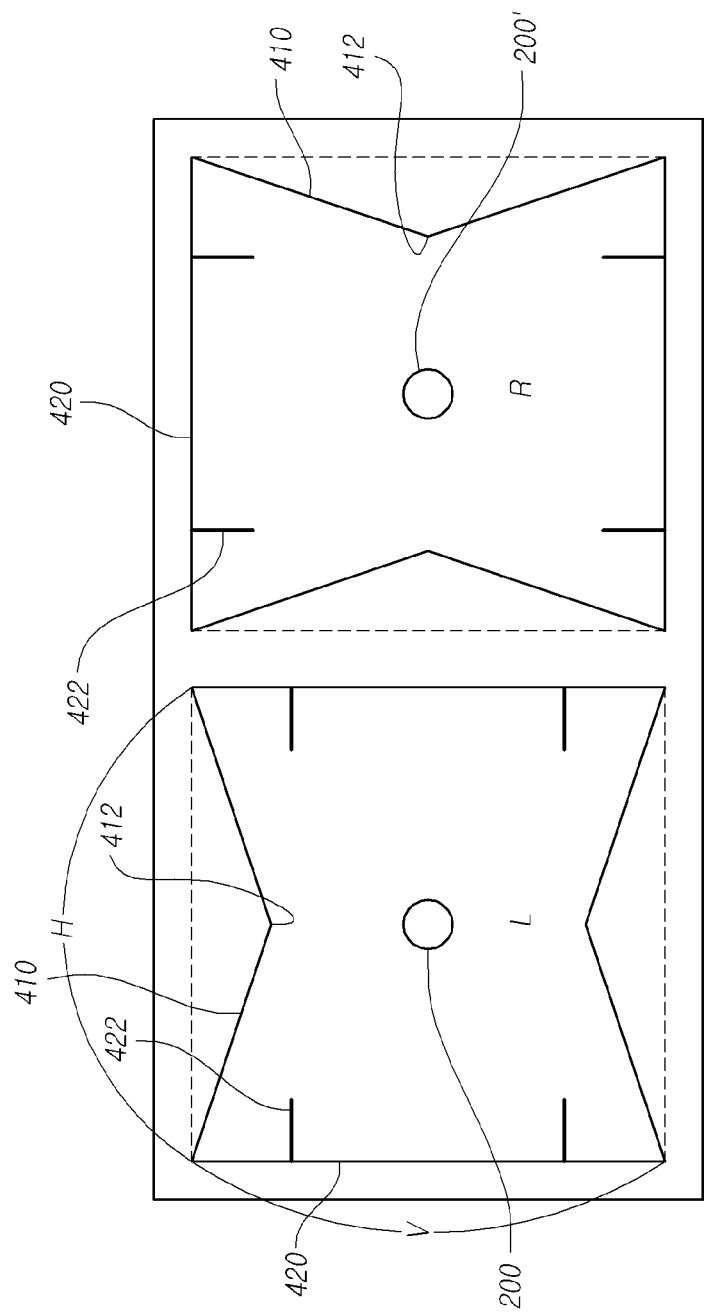

PANEL VIBRATION TYPE DISPLAY DEVICE FOR GENERATING SOUND

CROSS REFERENCE TO RELATED APPLICATIONS

This application claims the priority of Korean Application No. 10-2016-0037118, filed Mar. 28, 2016, Korean Application No. 10-2016-0040885, filed Apr. 4, 2016, Korean Application No. 10-2016-0041384, filed Apr. 5, 2016, Korean Application No. 10-2016-0066455, filed May 30, 2016, Korean Application No. 10-2016-0067431, filed May 31, 2016, Korean Application No. 10-2016-0083122, filed Jun. 30, 2016, Korean Application No. 10-2016-0161789, filed Nov. 30, 2016, Korean Application No. 10-2016-0162189, filed Nov. 30, 2016, and Korean Application No. 10-2016-0183867, filed Dec. 30, 2016, all of which are hereby incorporated by reference.

BACKGROUND

Technical Field

The present disclosure relates to a display device, and more particularly, to a display device for generating a sound by vibrating a display panel.

Description of the Related Art

With the development of various portable electronic devices, such as a mobile communication terminal and a notebook computer, requirements for display devices applicable thereto are increasing.

The display devices include a liquid crystal display device, an electroluminescent display device, a light emitting diode display device, and an organic light emitting diode display device.

Among these display devices, the liquid crystal display (LCD) device typically includes an array substrate including an array of thin film transistors, an upper substrate including a color filter layer and/or a black matrix, etc., and a liquid crystal material layer formed therebetween, wherein an alignment state of the liquid crystal is controlled according to an electric field applied between two electrodes of a pixel area, and thereby the transmittance of light is adjusted to display images.

In addition, an organic light emitting display device, which uses an organic light emitting diode (OLED) that emits light by itself, has advantages of a fast response speed, a high light-emitting efficiency, a high brightness, and a wide viewing angle.

Meanwhile, a set apparatus or finished product including such a display device as described above may include, for example, a television (TV), a computer monitor, or an advertising panel.

Such a display device or set apparatus includes a sound output device, such as a speaker, for generating and outputting sound relating to output images.

It is typical that a company which manufactures a display device, such as a liquid crystal display device or an organic light emitting diode display device, manufactures only a display panel or display device, while another company manufactures a speaker and assembles the speaker with the manufactured display device, to complete a set apparatus capable of outputting images and sound.

FIG. 1 is a schematic plan view of a speaker included in a related art display device. As shown in FIG. 1, the related art display device 1 includes a speaker 2 disposed at a rear part or a lower part of a display panel thereof.

In this structure, the sound generated by the speaker 2 may not directly progress toward a viewer, who is viewing an image from the front side of the display device 1, but progresses toward the rear part or the lower part of the display panel rather than the front part of the display panel on which the images are being displayed.

Further, when the sound generated from the speaker 2 progresses toward the rear part or the lower part of the display panel, the sound quality may be degraded due to an interference with sound reflected by walls, floors, or other surfaces at the rear of or below the display panel.

Also, the sound generated by a speaker included in the related art display device is not oriented toward a viewer of the display device and may thus undergo diffraction, which degrades the sound localization. Moreover, in configuring a set apparatus, such as a TV, a speaker may occupy an undesirably large amount of space, which imposes a restriction on the design and spatial disposition of the set apparatus.

Meanwhile, in recent years, a technique has been proposed in which an actuator vibrates a display panel or a vibrating plate that is attached to the display panel to then output a sound. However, such a sound output technique is limited to the operation in which only a single type of sound is output by vibrating the entire display panel.

Therefore, there has been an increasing requirement for technology that output various types of sounds at the same time, improves the quality of the output sound, and prevents hindering the viewer's concentration.

SUMMARY

Accordingly, embodiments of the present disclosure are directed to a display device that substantially obviates one or more of the problems due to limitations and disadvantages of the related art.

An aspect of the present disclosure is to provide a display device that generates a sound by directly vibrating a display panel that constitutes the display device.

Another aspect of the present disclosure is to provide a panel vibration type of sound generating display device that suppresses the sound pressure reduction caused by a standing wave that is generated by the interference between a reflection wave and a traveling wave.

Another aspect of the present disclosure is to provide a panel vibration type of sound generating display device that selects, as a plurality of sound output areas, one of either a 2-channel system that includes left and right areas for outputting a left and right stereo sound or a 2.1-channel system that further includes a central area for outputting a low-pitched sound in addition to the same, which reduces the sound pressure reduction caused by a standing wave while providing an excellent sound separation characteristic.

Additional features and advantages of the disclosure will be set forth in the description that follows, and in part will be apparent from the description, or may be learned by practice of the disclosure. The objectives and other advantages of the disclosure will be realized and attained by the structure particularly pointed out in the written description and claims hereof as well as the appended drawings.

To achieve these and other aspects of the inventive concepts as embodied and broadly described, a display device may comprise a display panel configured to display images; a plurality of sound generating actuators in a plurality of sound output areas, the sound generating actuators configured to vibrate the display panel to generate sound; and a partition that is between each of the plurality of sound output areas and surrounds at least one of the plurality of sound output areas.

Furthermore, a display device may comprise a display panel configured to display images; a plurality of areas behind the display panel and separated by a partition; and a plurality of sound generating actuators in the plurality of areas, the sound generating actuators configured to vibrate the display panel to generate sound, wherein at least one of the areas includes two or more of the sound generating actuators.

Furthermore, a display device may comprise a display panel configured to display images; a plurality of areas behind the display panel and separated by a partition; and a first sound generating actuator in a first of the plurality of areas, the first sound generating actuator configured to vibrate the display panel to generate sound, wherein a second of the plurality of areas does not include a sound generating actuator.

Furthermore, an apparatus may comprise a display panel configured to display images; a plurality of areas behind the display panel and separated by a partition; and a first sound generating actuator in a first of the plurality of areas, the first sound generating actuator configured to vibrate the display panel to generate sound, wherein a second of the plurality of areas does not include a sound generating actuator.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain the various principles. In the drawings:

FIG. 2A is a plan view and FIG. 2B is a cross-sectional view;

FIGS. 3A and 3B illustrate views for explaining the sound pressure reduction caused by a standing wave in the example where the sound separating partition portion is formed in a straight line form;

FIGS. 10 and 11A-11C illustrate views that variously show the form of each area and the disposition of bent portions and additional confining portions according to the position and form of the sound generating actuator in the 2-channel system in which the sound output areas include the left and right areas;

DETAILED DESCRIPTION

Figure 1:
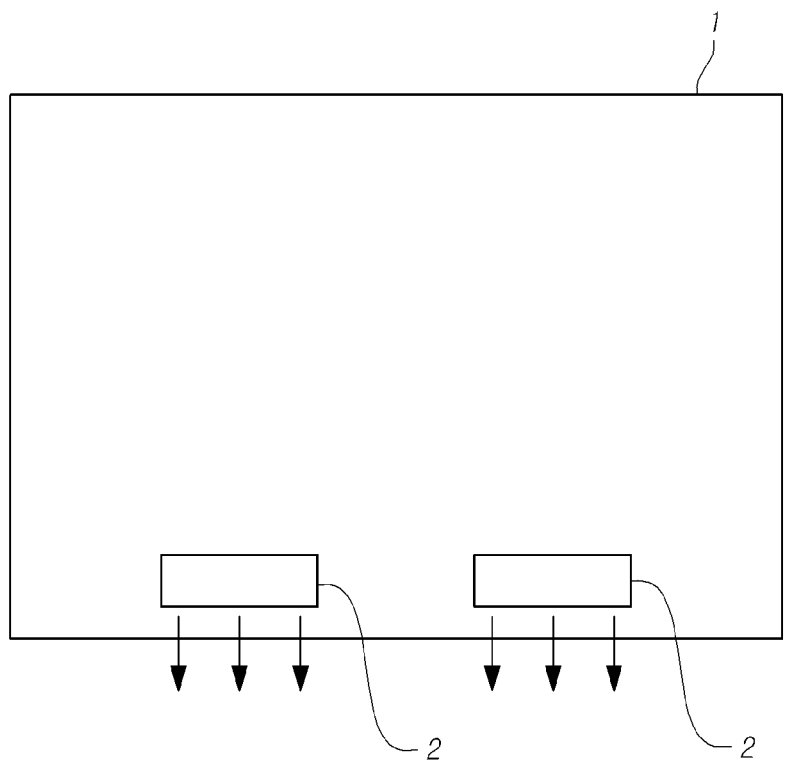
FIG. 1 is a plan view of speakers that are included in a related art display device.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed explanation of certain functions and configurations incorporated herein may have been merely for the sake of brevity.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

The term "display device" in the present specification is used to encompass a display device as a narrow meaning, such as a liquid crystal module (LCM) or an organic light emitting display module (OLED module), that includes a display panel and a driving unit for driving the display panel, and to further encompass set electronic device or a set device or a set apparatus, as a finished product, such as a laptop computer, a television set, a computer monitor, equipment display (e.g., display equipment in an automotive display or other type of vehicle display), or a mobile electronic device that is a complete product or a final product (for example, a smartphone or an electronic pad, etc.) that includes the LCM, the OLED module, or the like.

That is, the display device is used as a meaning that encompasses a display device itself, such as the LCM or the OLED module, but also includes a so-called "set device,"

which is an application product or final consumer device having a display device implemented therein.

However, in some cases, the LCM or OLED module comprised of a display panel and a driving unit thereof may be referred to as a "display device" in a narrow sense, and the electronic device as a finished product including the LCM or OLED module may be differently referred to as a "set device" or a "set apparatus". For example, the display device in a narrow sense may include a liquid crystal display (LCD) panel or an organic light emitting diode (OLED) display panel and a source PCB as a controller for driving the same, and the set device may further include a set PCB that is a controller set to be electrically connected to the source PCB and to control the overall operations of the set device or the set apparatus.

The display panel used in examples of the present embodiment may use all kinds of display panels, such as a liquid crystal display panel, an organic light emitting diode (OLED) display panel, a plasma display panel (PDP), or the like, and is not limited to a specific display panel technology as long as it can generate sound waves or audible outputs due to vibrations created by the sound generating actuator.

For example, the liquid crystal display panel as the display panel may be configured to include an array substrate that includes a plurality of gate lines and data lines, pixels that are in or near the intersection areas thereof, and thin film transistors acting as switching elements for controlling the light transmittance in each pixel, an upper substrate that is provided with a color filter layer and/or a black matrix, and a liquid crystal layer formed between the same.

Also, the organic light emitting diode (OLED) display panel as the display panel may include an array substrate that includes a plurality of gate lines and data lines, pixels that are in or near the intersection areas thereof, and thin film transistors for selectively applying voltage or current to each pixel, an organic light emitting diode (OLED) layer on the array substrate, and an encapsulation substrate that is disposed on the array substrate to cover the organic light emitting diode layer. The encapsulation substrate protects the thin film transistor and the organic light emitting diode layer from external impact, and prevents the penetration of moisture/oxygen into the organic light emitting diode layer. The layer on the array substrate may include an inorganic light emitting layer(s), for example, a quantum dot layer(s), nano-sized material layer(s), etc., that may enhance output image quality.

With any display type, the display panel may further include a backing, such as a metal plate attached thereto. Other structures may also be included.

The display panel having actuators as described in the specification may be implemented at a user interface module in a vehicle, such as at the central control panel area in an automobile. For example, such a display panel can be configured between two front seat occupants such that sounds due to vibrations of the display panel propagate towards the interior of the vehicle. As such, the audio experience within a vehicle can be improved when compared to having speakers only at the interior sides in the vehicle.

The display panel used in the display device according to examples of the described embodiments is not limited to a specific type, size, shape, etc. An LCD panel includes a number of laminated layers and includes a separate light source, for e.g., a backlight.

On the other hand, because the organic light emitting diode of the organic light emitting diode (OLED) display panel is a self-emitting element, a separate light source may not be required, and a plurality of layers, such as a polarization layer (POL), a glass layer, or an encapsulation layer, may be laminated into a single panel.

Meanwhile, the display panel used in the display device of an example of the present embodiment has a general structure such that detailed description thereof will be omitted.

Figure 2A:
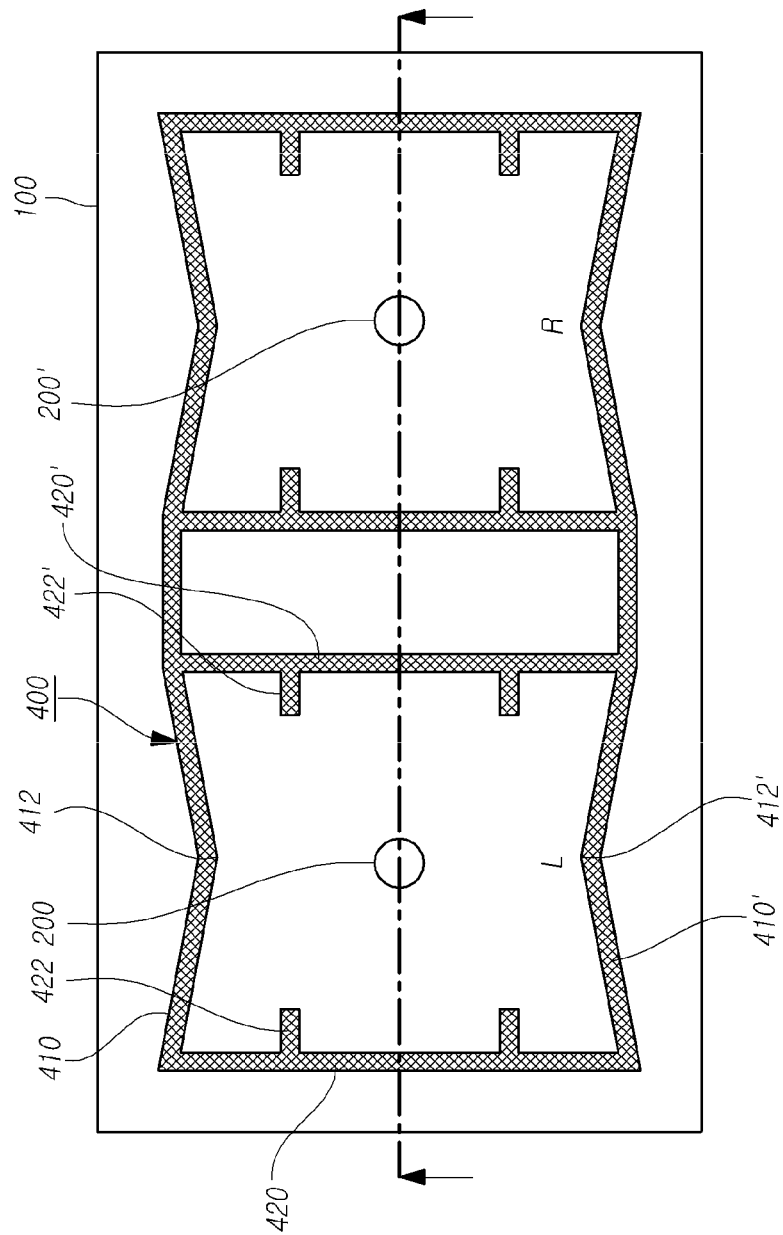
FIGS. 2A and 2B illustrate a display device including a panel vibration type of sound generating device, according to an example embodiment of the present disclosure, where
Figure 2B:
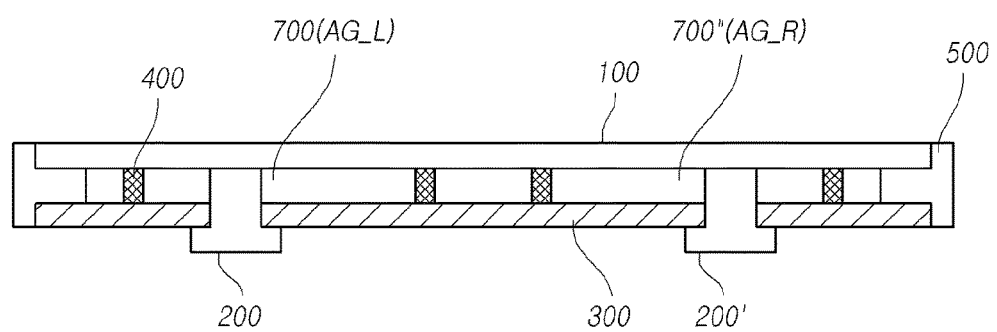

FIGS. 2A and 2B illustrate a display device including the panel vibration type of sound generating device, according to an example of the present embodiment, wherein FIG. 2A is a plan view and FIG. 2B is a cross-sectional view of FIG. 2A taken along line I-I'.

As shown in FIGS. 2A and 2B, the display device according to an example of the present embodiment is configured to include a display panel 100 for displaying images, two or more sound generating actuators 200 and 200' that vibrate the display panel while being in contact with one side of the display panel to generate a sound, and a cover bottom 300 that is a back support portion that covers the back surface of the display panel while supporting the sound generating actuators 200 and 200' and the display panel 100.

Meanwhile, according to an example of the present embodiment, a plurality of sound output areas are defined to output different sounds, respectively, within the display panel 100, and each of the sound generating actuators is disposed in each sound output area in order to thereby vibrate a display panel portion in the corresponding area to generate a sound.

In this case, a sound separating partition portion 400 may be further included, which is disposed to surround each sound output area while being in contact with the display panel 100 and the cover bottom 300 as the back support portion to define an air gap space inside each sound output area.

Meanwhile, an example of the present embodiment may be applied to both a 2-channel system that includes left and right areas for outputting a left and right stereo sound, and a 2.1-channel system that further includes a central area for outputting a low-pitched sound in addition to a plurality of sound output areas for left and right stereo sound. A 2-channel system that includes only the left and right areas will be described with reference to FIG. 2A.

That is, according to FIG. 2A, the sound output areas include a left area (L) and a right area (R) that are formed in the left side and right side of the display panel 100, respectively, in order to output a stereo sound, and the sound separating partition portion 400 for the left area includes four sides 410, 410', 420, and 420' that surround the left area (L).

Meanwhile, the sound separating partition portion 400 is a partition wall structure that is interposed between the display panel 100 and the cover bottom 300 as the back support portion, and members, such as a double-sided tape, may be used for the sound separating partition portion 400.

As shown in FIG. 2B, the sound separating partition portion 400 is an adhesive member that has a constant width and is disposed to surround the corresponding sound output area, wherein one side of the adhesive member is attached to the lower surface of the display panel 100 and the other side thereof is attached to the upper surface of the cover bottom 300 to form a hermetic air gap space in the corresponding sound output area.

Meanwhile, the left actuator 200 may be disposed in the left area (L) and the right actuator 200' may be disposed in the right area (R), wherein each actuator 200 and 200' may be fixed while being inserted into a support hole that is formed in the cover bottom 300 as the back support portion.

The left actuator 200 is in contact with the lower surface of the display panel 100 corresponding to the left area and vibrates the display panel 100 according to a supplied current signal to generate a left sound. Likewise, the right actuator 200' is in contact with the lower surface of the display panel 100 corresponding to the right area and vibrates the display panel 100 of the right area to generate a right sound.

An example of the form of the actuator and the principle in which the actuator vibrates the display panel to generate a sound will be described in more detail with reference to FIGS. 5A-6B below.

Meanwhile, the first air gap space 700 (AG_L) and the second air gap space 700' (AG_R) may be formed by means of the four sides of the sound separating partition portion 400, the upper portion of the display panel 100, and the lower portion of the cover bottom 300 in the left area (L) and right area (R), respectively.

The air gap spaces 700 and 700' function as enclosed spaces to confine a sound that is generated when the display panel 100 is vibrated by the left/right actuators 200 and 200', and the air gap spaces 700 and 700' increase the sound pressure to output the sound to the front.

Meanwhile, the sound separating partition portion 400 for each sound output area is comprised of four sides that surround the corresponding sound output area, and at least one (e.g., the first-side) of the four sides of the sound separating partition portion 400 may have a bent portion that is bent toward the sound generating actuator that is disposed in the corresponding area.

That is, as shown by example in FIG. 2A, the bent portions 412 and 412' that are bent toward the left actuator 200 are formed in first-sides 410 and 410' that are disposed in the upper and lower portions among four sides 410, 410' 420, and 420' of the sound separating partition portion 400 that surround the left area (L).

In other words, among the four sides that surround the left area (L), two upper and lower sides are configured with two straight partitions that extend inward to have a constant inclination angle with respect to the horizontal direction, and two straight partitions join to form the bent portion 412.

It may not be necessary to form the bent portion only by the joining of the straight lines. For example, a rounded bent portion may be formed in a curved shape.

In addition, one or more protruding confining portions 422 that protrude toward the left actuator 200 may be disposed in two second-sides 420 and 420' that are perpendicular to the first-sides. Although an example where two protruding confining portions are disposed in each of the second-sides to be spaced apart from each other in the vertical direction (when considered in a normal viewing orientation) is shown in FIG. 2, examples of the present disclosure are not limited thereto.

In addition, the protruding confining portion 422 may be formed to protrude in the horizontal direction from a specific position of the second-sides 420 and 420' that extend in the vertical direction.

The bent portions 412 and 412' and the protruding confining portions 422 and 422' are intended to overcome the reduction in the sound pressure caused by a standing wave that is generated by the interference between a traveling wave and a reflection wave that is reflected by the sound separating partition portion among the sound waves that are generated by the actuator, and the principles thereof will be described in more detail with reference to FIGS. 3A-4B.

Meanwhile, although the description above has been made with reference only to the left area in FIG. 2, the right area of the display panel may also have symmetrically the same configuration.

For convenience, the lateral direction or horizontal direction in example embodiments of the present specification refers to the long-side direction of the display device, and the longitudinal or vertical direction refers to the short-side direction of the display device.

Meanwhile, an end point of the bent portions 412 and 412' formed in the first-side 410 or 410' of the sound separating partition portion 400 may be directed to the center of the sound generating actuator 200 or 200' that is disposed in the corresponding sound output area.

The sound separating partition portion 400, according to an example of the present embodiment, is a confining member for preventing the transfer of a sound generated in the corresponding sound output area to another sound output area (e.g., the sound separating partition portion 400 may serve as a baffle). The sound separating partition portion 400 may be configured with a double-sided tape or a one-sided tape formed of polyurethane (PU) or polyolefin (PO) to have a specific height (thickness) and width, or from some other appropriate material, and may have the elasticity to be compressed to some extent. In some examples, the sound separating partition portion 400 may be formed of one piece of material, while in other examples, the sound separating partition portion 400 may be formed of separate pieces of material.

The sound separating partition portion 400 may be represented by other terms, such as a foam pad or a confining member.

Thus, when using the display device in the structure of FIGS. 2A and 2B, left and right stereo sound may be generated by supplying different currents to the left actuator 200 and the right actuator 200', respectively, and the left and right sounds may be separated by means of the sound separating partition portion in order to thereby output an excellent stereo sound.

Hereinafter, the remaining elements of the display device, according to an example of the present embodiment, will be described in detail.

As will be described in more detail with reference to FIGS. 5A-5B and the like, the sound generating actuator 200 or 200', according to an example of the present embodiment, includes a magnet, a plate for supporting the magnet, a center pole that is formed to protrude from the central area of the plate, and a bobbin that is disposed to surround the center pole and has a coil that is wound around the same to be applied with a sound generating current. The front end of the bobbin is disposed to come into contact with the one side of the display panel. However, such detailed structure is merely exemplary, as various other equivalent components can be used to implement the actuators used for the embodiments of the present disclosure.

As shown in FIG. 2B, the display device may include a back support portion for supporting at least one of the back surface or the lateral surface of the display panel, and the plate of each actuator is fixed to its supporting structure.

The back support portion may include a cover bottom 300 that is disposed on the back surface of the display panel, and may further include a middle cabinet 500 that surrounds the lateral surface of the display panel while being coupled with the cover bottom so as to receive and support the one side edge of the display panel.

The cover bottom that constitutes the back support portion may be a flat plate member that is formed of a metal or plastic material to extend throughout the back surface of the display device.

That is, the display device according to an example of the present embodiment may further include the cover bottom 300 as a back supporting structure, and the cover bottom 300 may execute functions of supporting the back side of the display panel 100 while being coupled to the middle cabinet 500 and fixing the actuator of an example of the present embodiment.

In this case, the cover bottom 300 is not limited to a specific term, and may be referred to as other terms, such as a plate bottom, a back cover, a base frame, a metal frame, a metal chassis, a chassis base, an m-chassis, or the like. Furthermore, the cover bottom 300 shall be understood to encompass all types of frames or flat plate structures that are disposed at the bottom of the back side of the display device to support the display panel. However, the support structure may include additional parts, may include multiple parts, and need not cover an entire rear of the display device. Further, the sound generation actuator may be directly or indirectly secured to the support structure.

Figure 3B:
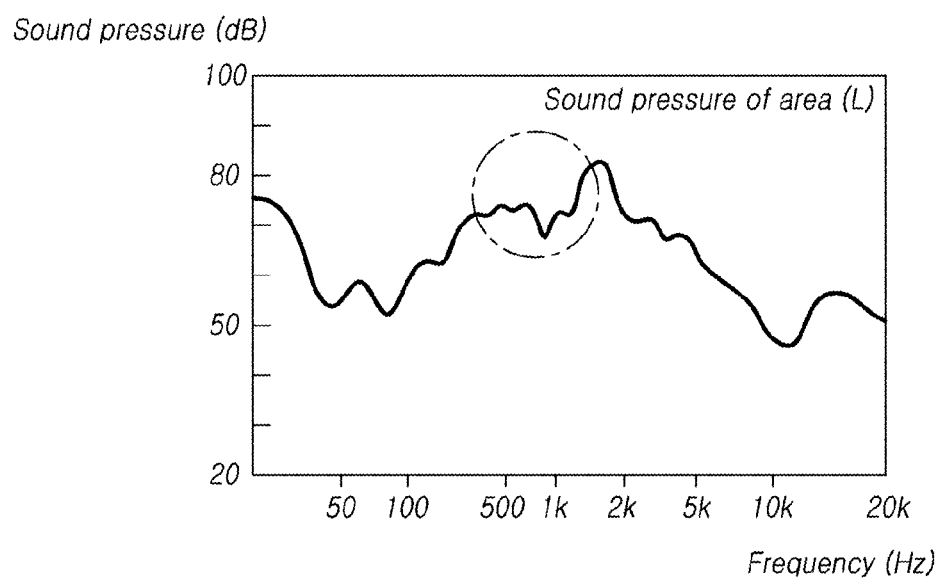
Figure 4A:
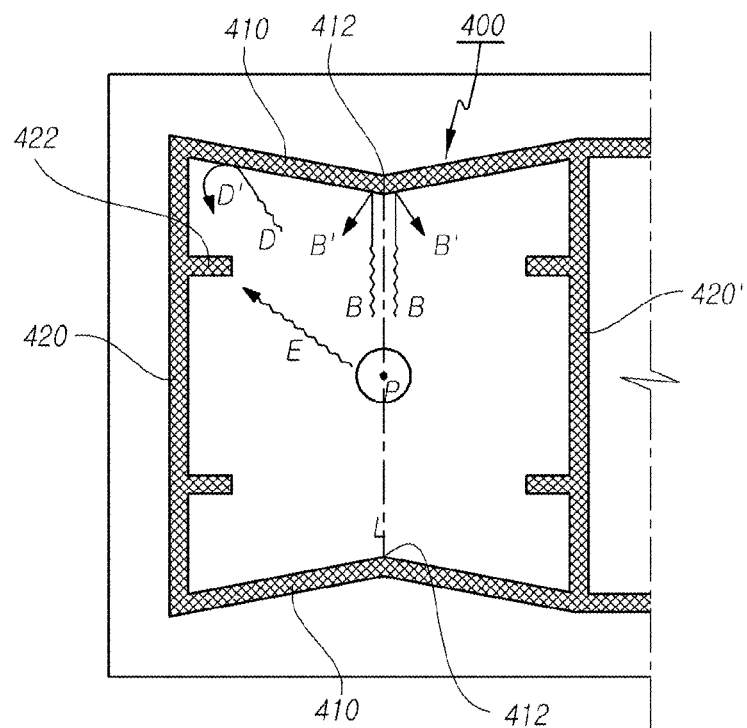
FIGS. 4A and 4B illustrate views for explaining the sound output characteristics in the example where a bent portion is formed in one or more sides that constitute the sound separating partition portion, according to examples of the present embodiments.
Figure 4B:
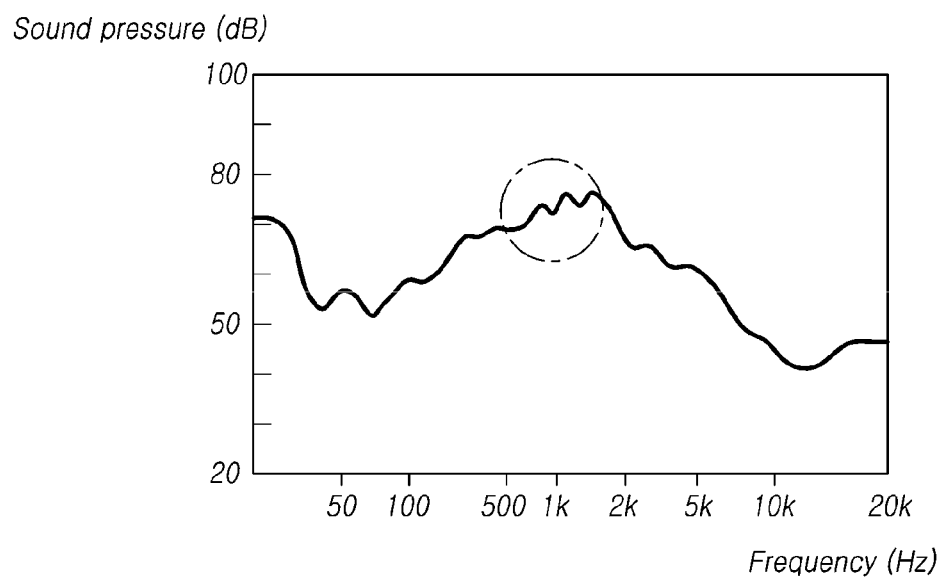

FIGS. 3A and 3B illustrate views for explaining the sound pressure reduction caused by a standing wave in the case where the sound separating partition portion is formed in a straight line, and FIGS. 4A and 4B illustrate views for explaining the sound output characteristics in the case where a bent portion is formed in one or more sides that constitute the sound separating partition portion, according to an example of the present embodiment.

As shown in FIG. 3A, each actuator 20 and 20' vibrates the display panel 10 to generate a sound wave that proceeds and radially spreads from the center of the actuator 20 and 20', and such a sound wave is referred to as a traveling wave (A) herein for convenience.

In this case, when the traveling sound wave reaches one side of the sound separating partition portion 40, it is reflected by the sound separating partition portion 40 to then form a reflection wave (A') that proceeds in the opposite direction.

Such a reflection wave overlaps and interferes with the traveling wave to form a so-called standing wave that refers to the overlapped sound wave that cannot proceed and that stagnates in a specific position. The standing wave causes a reduction in the sound pressure, and deteriorates the sound output characteristics.

That is, as shown in FIG. 3A, a standing wave is generated by the traveling wave (A) from the actuator and the reflection wave (A') that is reflected by one side of the sound separating partition portion 40, and according thereto, the sound pressure is reduced in a specific frequency band in order to thereby deteriorate the sound output characteristic.

Such a phenomenon may be particularly dominant in the position in which the distance between the actuator and the sound separating partition portion is shortest (that is, the positions between the actuator and the respective sides of sound separating partition portion in the horizontal and vertical directions, respectively, in FIG. 3A).

As indicated by a circle in FIG. 3B, it is shown that the sound pressure is unstable or is reduced in a specific frequency band (e.g., at a frequency of about 1 kHz) due to the influence of the standing wave.

On the contrary, as shown in FIG. 4A, when the bent portion 412 of an example of the present embodiment is formed, the traveling wave (B) that proceeds in the vertical direction with respect to the actuator as shown in FIG. 3A is obliquely reflected to the left and right (a reflection wave B') in order to thereby reduce the generation of the standing wave caused by the overlapping of the traveling wave (B) and the reflection wave (B'). Therefore, the aforementioned sound pressure reduction caused by the standing wave may be improved.

In addition, because the aforementioned first-side 410 of the sound separating partition portion 400 is formed obliquely, the reflection wave (D') of a traveling wave (D) that heads for the edge of the first-side from the actuator is more likely to overlap or interfere with another traveling wave (E) around the corner of the sound output area to then generate another standing wave.

In this case, the protruding confining portion 422 that is formed in the second-side 420 of the sound separating partition portion 400 may block the reflection wave (D') to further suppress the generation of the standing wave caused by the interference between the traveling wave (E).

FIG. 4B illustrates the sound output characteristics in the case of the example of the present embodiment as described in FIG. 4A. In comparison to FIG. 3B, it can be seen that the sound pressure relatively increases in a specific frequency band (e.g., at a frequency of about 1 kHz) and the uniformity of the sound pressure is improved in the same frequency band.

As a result, according to an example of the present embodiment, it may be possible to reduce the sound pressure reduction caused by the standing wave by forming a bent portion that is directed to the actuator on the first-side that receives a strong sound wave, and by forming a protruding confining portion in a specific position of the second-side that is perpendicular to the first-side among the four sides of the sound separating partition portion.

Meanwhile, the sides that include the bent portion and the protruding confining portion, as well as the position and size of the bent portion and protruding confining portion, may be related to the shape of the sound output area and the disposition of the actuator, which will be described in more detail with reference to FIGS. 10 to 14.

Figure 5A:
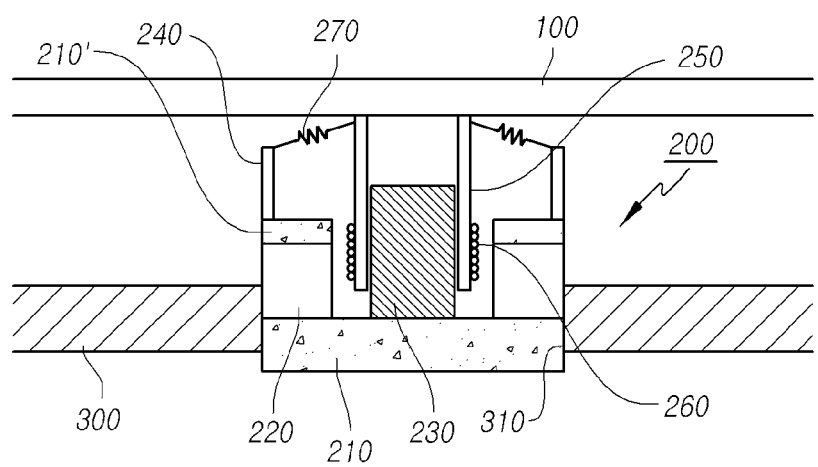
FIGS. 5A and 5B illustrate cross-sectional views of two types of sound generating actuators that can be used in examples of the present embodiment.
Figure 5B:
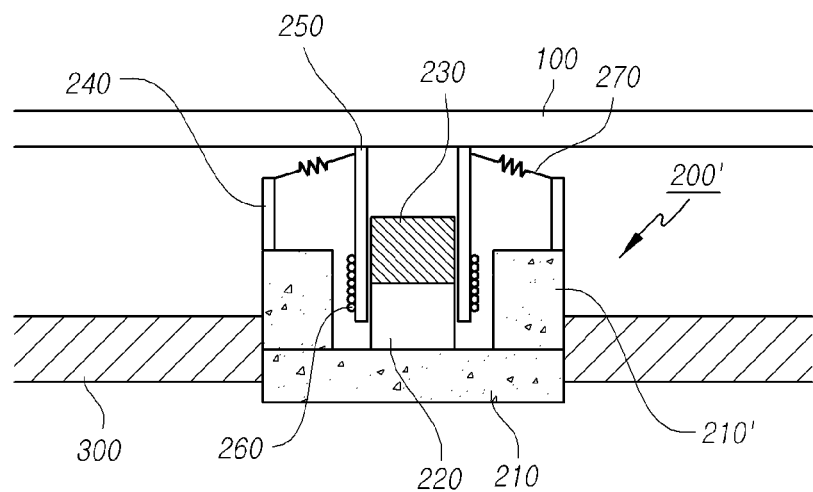

FIGS. 5A and 5B illustrate cross-sectional views of two types of sound generating actuators that can be used in examples of the present embodiment.

The sound generating actuator or the actuators 200 and 200' used in an example of the present embodiment may have the same configuration, and although the following description will be made with regard to the left actuator for convenience, it may also be applied to the other actuator.

The left actuator 200 may be configured to include a permanent magnet 220, plates 210 and 210' for supporting the magnet, a center pole 230 that protrudes from the central area of the plate, a bobbin 250 that is disposed to surround the center pole 230, and a coil 260 that is wound around the outer portion of the bobbin to be applied with a sound generating current.

Meanwhile, the sound generating actuator used in an example of the present embodiment may adopt a first example structure in which the magnet is arranged outside the coil, or second example structure in which the magnet is arranged inside the coil.

FIG. 5A shows the first structure in which the magnet is arranged outside the coil, which may be referred to as a dynamic type or external magnet type. In the sound generating actuator 200 according to the first structure, a lower plate 210 is fixed to a support hole 310 that is formed on the cover bottom 300, and the annular permanent magnet 220 is disposed on the outer portion of the lower plate 210.

An upper plate 210' is placed on the magnet 220, and an external frame 240 is formed on the outer portion of the upper plate 210' to protrude from the upper plate 210'. Meanwhile, the center pole 230 is disposed in the central area of the lower plate 210 to protrude from the lower plate 210, and the bobbin 250 is disposed to surround the center pole 230. The coil 260 is wound around the lower portion of the bobbin 250, and the coil is applied with a sound generating current. Meanwhile, a damper 270 may be disposed between the upper portion of the bobbin 250 and the external frame 240.

The lower plate 210 and the upper plate 210' are configured to fix the sound generating actuator 200 to the cover bottom 300 while supporting the magnet 220, and the lower plate 210 is provided in a circle shape as shown cross-sectionally in FIG. 5A. Then, the magnet 220 in a ring shape is provided on the lower plate 210, and the upper plate 210' is provided on the magnet 220.

In addition, according to the coupling of the lower plate 210 and the upper plate 210' to the cover bottom 300, the magnet 220 positioned between the lower plate 210 and the upper plate 210' may be fixed and supported.

The plates 210 and 210' may be formed of a material having magnetism, such as iron (Fe). The plate is not limited to a specific term, and may be referred to as other terms, such as a yoke.

Meanwhile, the center pole 230 and the lower plate 210 may be integrally formed.

The bobbin 250 may have an annular structure that may be formed of paper or an aluminum sheet, and the coil 260 is wound around a specific lower area of the bobbin 250. The configuration including both the bobbin 250 and the coil 260 may be expressed as a voice coil.

When a current is applied to the coil 260, a magnetic field is formed around the coil 260. In this case, with the external magnetic field that is formed by the magnet 220, the bobbin 250 moves up while being guided by the center pole 230 according to Fleming's law.

Meanwhile, because the end of the bobbin 250 is in contact with the back surface of the display panel 100, the display panel 100 is vibrated depending on the supply or non-supply of a current so that a sound wave may be generated by the vibration.

The magnet 220 may use a sintered magnet, such a barium ferrite, and may use a cast magnet formed of an alloy of ferric oxide ($Fe_2O_3$), barium carbonate ($BaCO_3$), strontium ferrite having an improved magnetic component, aluminum (Al), nickel (Ni), and cobalt (Co), without being limited thereto.

Meanwhile, the damper 270 is disposed between the upper portion of the bobbin 250 and the external frame 240, and the damper 270 has a corrugated structure to regulate the vertical vibration of the bobbin while contracting or stretching according to the vertical movement of the bobbin. That is, because the damper 270 is connected to the bobbin 250 and the external frame 240, respectively, the vertical vibration of the bobbin 250 is restricted by a restoring force of the damper 270. In more detail, when the bobbin 250 vibrates more or less than a specific value, the bobbin 250 may return to the original position by means of the restoring force of the damper 270. Such a damper 270 may be expressed as other terms, such as an edge.

FIG. 5B shows the second structure in which the magnet is arranged inside the coil, which may be referred to as a micro type or internal magnet type.

In the sound generating actuator according to the second structure, a lower plate 210 is fixed to a support hole 310 that is formed in the cover bottom 300. In addition, a magnet 220 is disposed in the central portion of the lower plate 210, and a center pole 230 is formed on the magnet 220 to extend.

An upper plate 210' is formed on the outer portion of the lower plate 210 to protrude from the lower plate 210, and an external frame 240 is disposed on the outer portion of the upper plate 210'.

A bobbin 250 is disposed to surround the magnet 220 and the center pole 230, and a coil 260 is wound around the outer surface of the bobbin 250.

In addition, a damper 270 is disposed between the external frame 240 and the bobbin 250.

In comparison to the first structure in which the magnet is arranged outside the coil, the sound generating actuator of the second structure may have a small leakage magnetic flux and may be miniaturized.

The actuator according to one of either the first example structure or the second example structure may be used in examples of the present embodiments. The following description will refer to the first structure for convenience.

The sound generating actuator used in the display device of an example of the present embodiment is not limited to the example configurations of FIGS. 5A and 5B, and any actuator can be used as long as it can generate a sound by vibrating the display panel up and down according to the supply of a current.

Figure 6A:
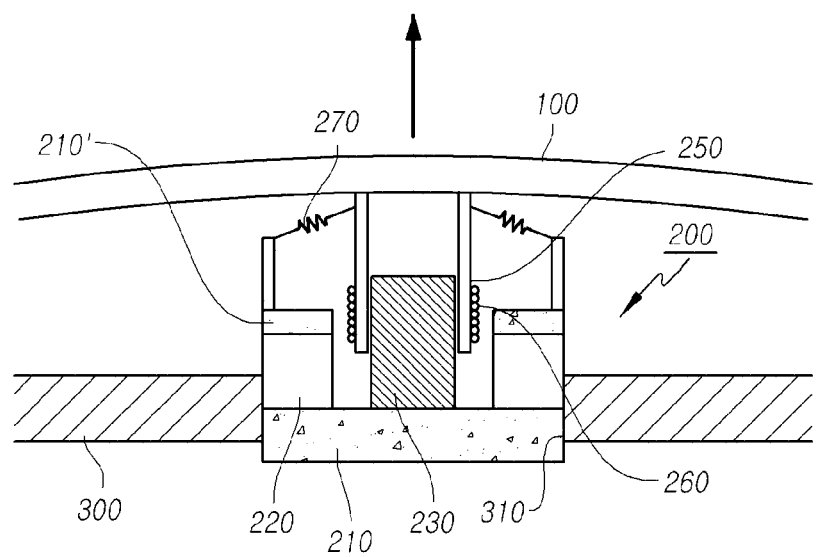
FIGS. 6A and 6B illustrate the principles in which a sound generating actuator vibrates a display panel to generate a sound, according to an example embodiment of the present disclosure.
Figure 6B:
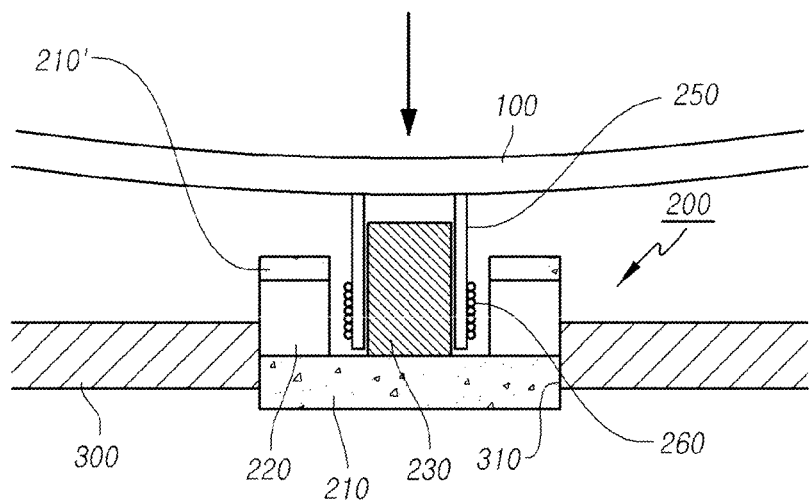

FIGS. 6A and 6B illustrate an example state in which the sound generating actuator vibrates the display panel to generate a sound, according to an example embodiment of the present disclosure.

FIG. 6A shows a state in which a current is applied, wherein the center pole 230 connected to the lower surface of the magnet 220 becomes the N pole, and the upper plate 210' connected to the upper surface of the magnet 220 becomes the S pole to form an external magnetic field between the coil 260.

In such a state, when a sound generating current is applied to the coil 260, an applied magnetic field is formed around the coil 260 so that a force for moving the bobbin 250 upwards is generated by the applied magnetic field and the external magnetic field.

Accordingly, as shown in FIG. 6A, the bobbin 250 moves upwards (arrow direction), and the display panel 100 in contact with the end of the bobbin 250 vibrates upwards.

In this state, when the current supply is stopped or when a current is applied in the opposite direction, as shown in FIG. 6B, a force for moving the bobbin 250 downwards is generated in a similar manner, and thus, the display panel 100 vibrates downwards (arrow direction).

As described above, the display panel vibrates up and down depending on the direction and intensity of the current applied to the coil, and such a vibration generates a sound wave.

Figure 7A:
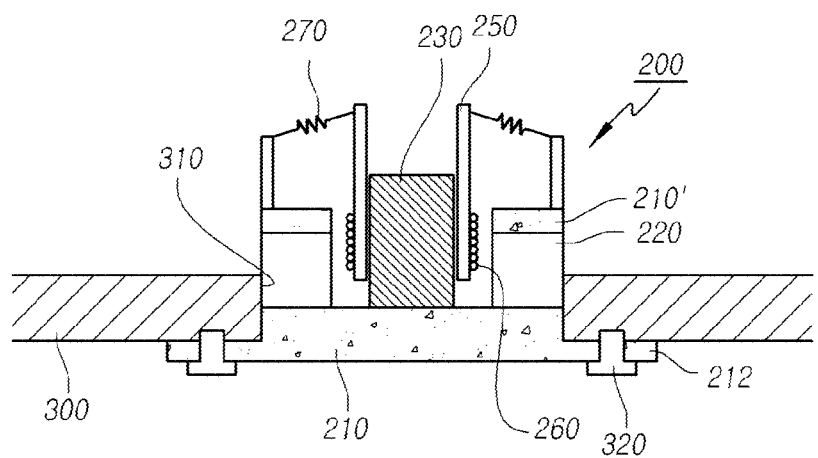
FIGS. 7A and 7B illustrate an example of the connecting state between a sound generating actuator and a cover bottom that is a back support portion of the display device, according to an example embodiment of the present disclosure.
Figure 7B:
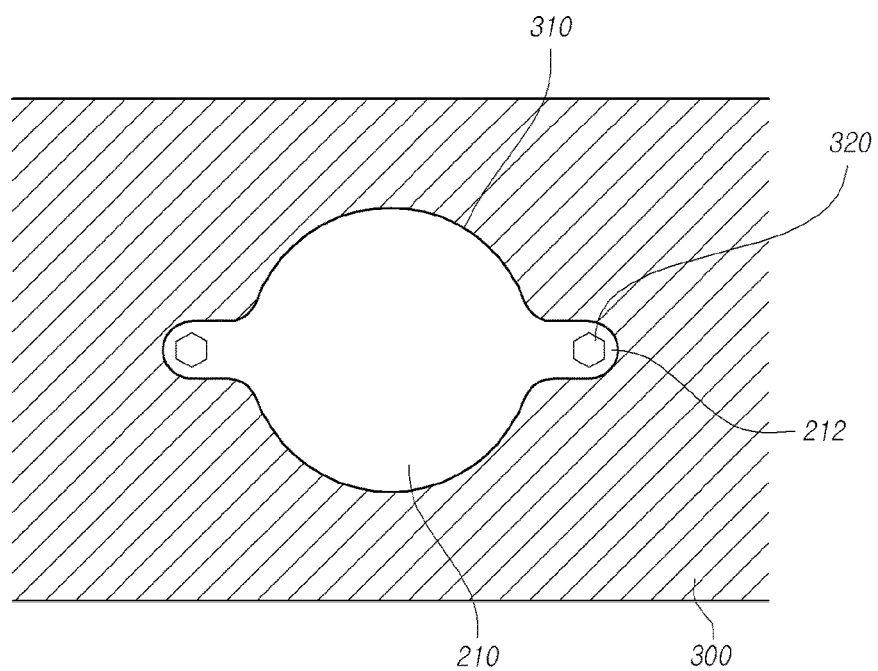
Figure 8A:
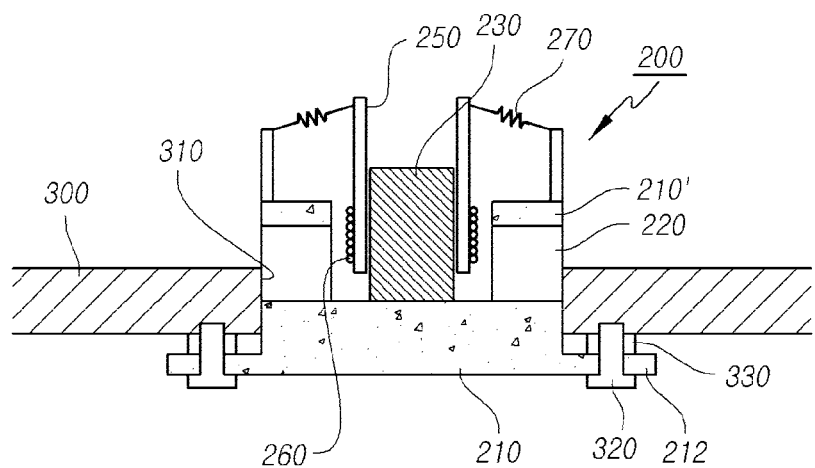
FIGS. 8A and 8B illustrate other examples of a connecting structure between the sound generating actuator and the cover bottom.
Figure 8B:
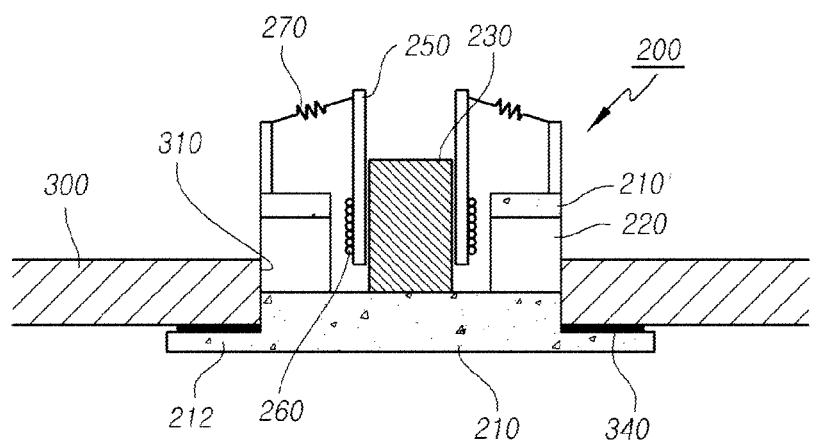

FIGS. 7A and 7B illustrate an example of the coupling state between the sound generating actuator and the cover bottom that is a back support portion of the display device, according to an example embodiment of the present disclosure, and FIGS. 8A and 8B illustrate other example embodiments of a coupling structure between the sound generating actuator and the cover bottom.

The sound generating actuator 200, according to an example of the present embodiment, may be inserted into and supported by a support hole that is formed in the cover bottom or the back cover that is a support structure of the display device. FIGS. 7A-8B illustrate various support structures.

In the support structure of FIGS. 7A and 7B, a support hole 310 is formed in the cover bottom 300 to pass through the same, and at least one of the lower plate 210, the magnet 220, and the upper plate 210' of the sound generating actuator 200 may be inserted into the support hole 310 to thereby be received.

An extension part 212 may be further formed in the lower surface of the lower plate 210 to extend outwards from the same, and the extension part 212 is fixed to the lower surface of the cover bottom 300 so that the sound generating actuator 200 may be mounted on the cover bottom 300.

As described above, if the sound generating actuator 200 is inserted into the support hole 310 formed on the cover bottom 300 to then be fixed, it may be possible to reduce the distance between the display panel 100 and the cover bottom 300, thereby reducing the thickness of the display device.

That is, the first air gap space and the second air gap space may be required to be provided between the display panel 100 and the cover bottom 300, in order to provide a space for the vibration of the display panel 100. If the sound generating actuator 200 is configured to be inserted/fixed into the support hole 310 of the cover bottom 300, the height of the sound generating actuator 200 disposed between the display panel 100 and the cover bottom 300 may be reduced in order to thereby reduce the air gap.

With regard to the fixing of the sound generating actuator 200 to the cover bottom 300, FIG. 7B shows a structure in which a screw hole is formed on the back side of the cover bottom 300 and a bolt 320 or screw engages with the screw hole of the cover bottom 300 by passing through a through-hole that is formed on the extension part 212 of the lower plate 210 to then fix the sound generating actuator 200.

Meanwhile, FIG. 8A shows an example in which the sound generating actuator 200 is fixed by a bolt 320 while interposing a self-clinching nut 330 (e.g., PEM® nut or other self-clinching nut) between the cover bottom 300 and the extension part 212 of the lower plate 210 in order to secure a constant distance therebetween, instead of the simple screw coupling structure.

In the case of using the self-clinching nut 330 (e.g., PEM® nut or other self-clinching nut) as shown in FIG. 8A, because a constant space may be secured between the sound generating actuator 200 and the cover bottom 300, it may be possible to reduce the transfer of vibration from the actuator 200 to the cover bottom 300.

In addition, in FIG. 8B, the sound generating actuator 200 may be fixed by disposing an adhesive member 340, such as a double-sided tape, between the extension part 212 of the lower plate 210 of the actuator 200 and the cover bottom 300.

In the case of using the adhesive member 340 as shown in FIG. 8B, the adhesive member 340 may play the role of a damper through the proper adjustment of the elasticity and thickness of the adhesive member 340, and thus, it may be possible to reduce the transfer of vibration from the actuator 200 to the cover bottom 300.

As shown in FIGS. 7A-8B, the example structure, in which the sound generating actuator 200 that directly vibrates the display panel 100 while being in contact with the same is inserted and fixed into the support hole 310 formed on the cover bottom 300, may give an effect of reducing the thickness of the display device, in comparison to the case in which the actuator 200 is completely received inside the display panel 100.

Figure 9:
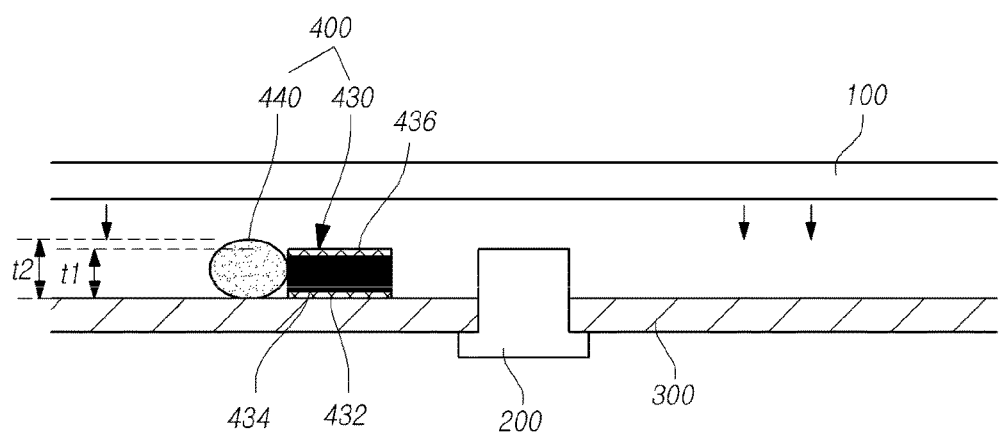
FIG. 9 illustrates a detailed structure of a sound separating partition portion that is used in an example of the present embodiment.

FIG. 9 illustrates a detailed structure of the sound separating partition portion that is used in an example of the present embodiment. As shown in FIG. 9, the sound separating partition portion is used to form an air gap space in each sound output area in an example of the present embodiment.

That is, in order for the display panel to vibrate to generate a sound wave, one side of the display panel may be required to be bonded to the support structure of the display panel. For example, the generated sound may be prevented from leaking to the outside through the lateral side or the like of the display device. To this end, the display device, according to an example of the present embodiment, has a constant sound separating partition portion 400 that is formed between the lower surface of the display panel and the support structure.

In more detail, a sound output area is defined for each sound generating actuator to enclose a predetermined area (that is, the air gap space) around the sound generating actuator, and the sound separating partition portion is disposed between the lower surface of the display panel and the upper surface of the cover bottom at the edge of the sound output area.

In this case, the sound separating partition portion 400 may be configured to include an adhesive member 430, such as a double-sided tape, that is interposed between the lower surface of the display panel and the upper surface of the support structure of the display device, and a sealing portion 440 that is further disposed in the outside of the adhesive member.

The adhesive member 430 may be configured to include a first adhesive part 432 that is bonded to the upper surface of the cover bottom 300, a second adhesive part 436 that is bonded to the lower surface of the display panel, and a body part 434 between the first and second adhesive parts 432 and 436. The body part 434 may have a constant elasticity to be compressed when attaching the display panel 100.

Also, the sealing portion 440 constituting the sound separating partition portion 400 may be further disposed in the outside of the adhesive member 430, and may have a greater thickness or height than the thickness or height of the adhesive member 430.

The sealing portion 440 may be configured of a material having a large elasticity, such as rubber, and may have a greater thickness t2 than the thickness t1 of the adhesive member 430 as shown in FIG. 9.

That is, as shown in FIG. 9, the first adhesive part 432 of the adhesive member 430, which is a double-sided tape having a thickness t1, is bonded to the upper surface of the cover bottom 300, and the sealing portion 440, which is formed of an elastic material having a greater thickness than t1, is disposed in the outside of the adhesive member 430.

In such a state, when the display panel 100 is attached to the second adhesive part 436 of the adhesive member 430, the display panel 100 and the cover bottom 3000 may be attached to each other while the sealing portion 440, having a greater thickness, is compressed to some extent.

As described above, the sealing of the air gap space 700 or 700' in the sound output area around each actuator may be further improved because the sound separating partition portion 400 has a double structure of the adhesive member 430 and the sealing portion 440.

Although the thickness of the air gap space (that is, the distance between the display panel 100 and the cover bottom 300 in the air gap space) may be adjust to be about 0.8 mm to 2.5 mm, it is not limited thereto, and it may vary depending on the degree of vibration of the display panel.

Figure 11A:
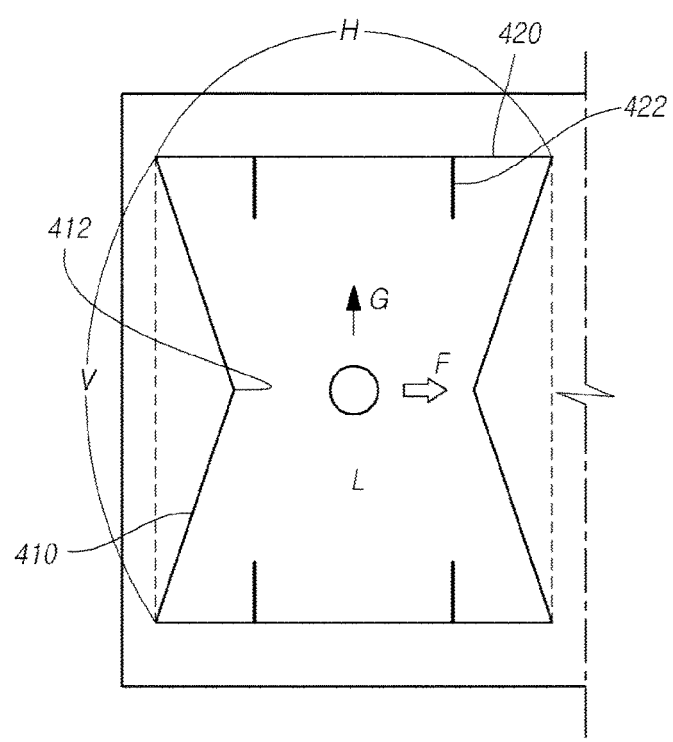
Figure 11B:
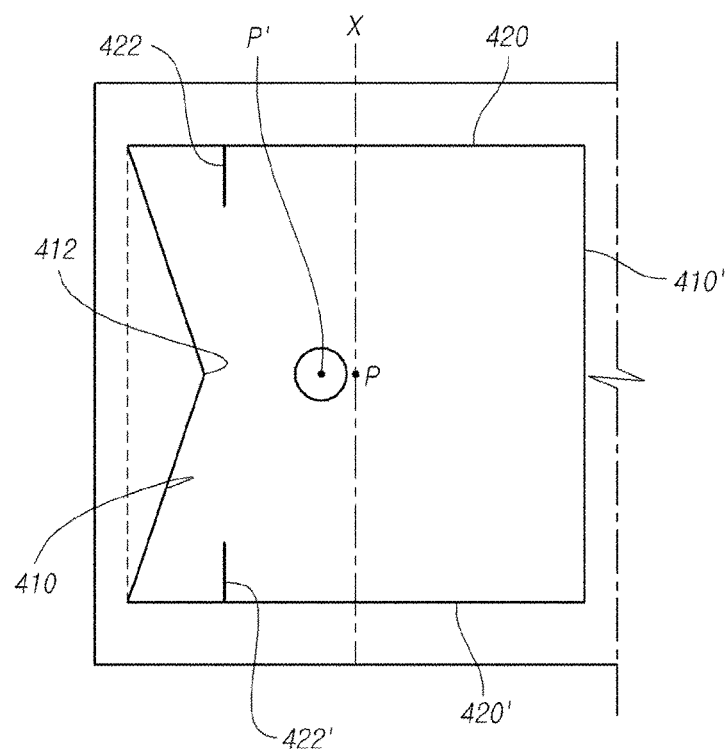
Figure 11C:
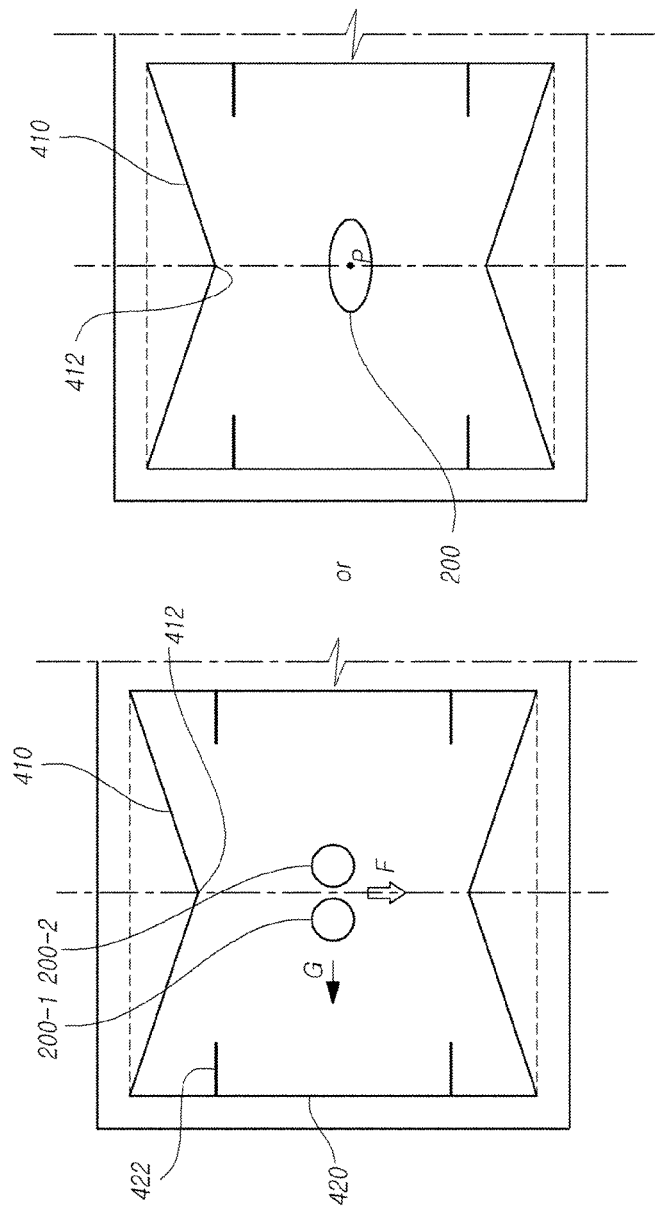

FIGS. 10-11C illustrate views that variously show the form of each sound output area and the disposition of bent portions and additional confining portions according to the position and form of the sound generating actuator in the 2-channel system in which the sound output areas include the left and right areas.

The respective sides constituting the sound separating partition portion are shown in solid lines for convenience in FIG. 10.

As described above, the standing wave that causes the sound pressure reduction may be dominant in the position where the traveling wave and the reflection wave have a large intensity.

Therefore, the bent portion, according to an example of the present embodiment, may be disposed in the position where the sound wave received from the sound generating actuator has the maximum intensity. FIGS. 10 and 11 show various configurations in which the bent portions and protruding confining portions are disposed in the 2-channel system.

First, FIG. 10 shows the left area and the right area in a square shape having the same horizontal (H) and vertical (V) length, wherein the actuators 200 and 200' are disposed in the center of each area.

In this case, as shown in the left area (L), among four sides of the sound separating partition portion that defines the left area, bent portions 412 may be formed in the two (upper and lower) first-sides 410, and two protruding confining portions 422 may be formed in each of the two (left and right) second-sides 420 that are perpendicular to the first-sides 410.

Also, in consideration of the perfect symmetry in the example case of FIG. 10, the first-side 410 of the bent portions 412 may be the left and right sides, and the protruding confining portions 422 may be formed in the second-sides 420 as the upper and lower sides as shown in the right area (R). Also, the protruding confining portion 422 may not be formed in the second-sides 420.

In this example, the bent portion may be formed in all of the four sides. However, in such a case, the area of the sound output area decreases, and as a result, the area of the vibrating plate also decreases. Therefore, the overall sound pressure may be reduced or the sound frequency may increase.

Accordingly, as shown in FIG. 10, the bent portion 412 may be formed in two first-sides among the four sides and to dispose the protruding confining portion 422 in the two remaining sides, and thus, the problems caused by the standing wave may be solved while lessening a reduction in the area of the vibrating plate.

Meanwhile, according to the structure as shown in FIG. 10, because the actuator is positioned in the center of the corresponding sound output area in the horizontal direction (or left and right directions) and/or in the vertical direction (or upper and lower directions), the portion of the display panel of the corresponding area can be uniformly vibrated. Accordingly, it may be possible to secure a stable sound output and the durability and reliability of the display panel.

FIG. 11A shows the case of the asymmetric disposition or asymmetric output characteristics of the actuator. In this example, the selection of the first-side and the position of the bent portion that is formed on the same may be determined according to the disposition of the actuator or the output characteristics of the actuator.

First, the example in which the horizontal side of the sound output area is different from the vertical side thereof in its length, as shown in FIG. 11A, will be described. In some embodiments, the standing wave that causes the sound pressure reduction may be dominant in the position where the traveling wave and the reflection wave have a large intensity, and the generation of the standing wave may, in some examples, increase in the central portion of a long side among the horizontal and vertical sides.

That is, in the case where the vertical (V) side of the left area is longer than the horizontal (H) side as shown in FIG. 11A, and in some embodiments, the intensity of the sound wave (F) that reaches the left and right vertical sides may be greater than the sound wave (G) that reaches the upper and lower horizontal sides.

Accordingly, among the left and right sides of the sound output area, the long left and right sides may be defined as the first-sides 410, and the bent portions 412 are formed in the first-sides 410. One or more protruding confining portions 422 may be selectively disposed in the short sides among the left and right sides.

However, embodiments are not limited thereto, and in an another example which may be applied to embodiments described herein, bent portions 412 may be formed in the short sides among the left and right sides, and one or more protruding confining portions 422 may be selectively disposed in the long sides among the left and right sides.

FIG. 11B shows an example where the sound generating actuator is disposed in an asymmetric position in the sound output area. In this example, the first-side 410 that has a bent portion 412 formed therein may be a single side that is closest to the sound generating actuator.

In other words, in the case where the actuator is disposed in the position (P') that is eccentricated to the left based on the horizontal center point (P) of the sound output area as shown in FIG. 11B, the left vertical side that is closest to the actuator is selected as the first-side 410 among four sides of the sound separating partition portion, and a bent portion 412 is disposed in the center thereof.

In this case, one or more protruding confining portions 422 and 422' may be disposed in the upper and lower second-sides 420 and 420'.

In this case, the bent portion 412 may not be formed in the right vertical side 410' facing the first-side 410, because the generation of the standing wave therein may be negligible, and the protruding confining portions 422 and 422' may not be formed in the right portion of the upper and lower horizontal sides.

Meanwhile, when the sound waves generated by the sound generating actuator have an asymmetric characteristic, one side or two sides for which the strong one of the sound waves heads may be the first-sides.

Such an example is shown in FIG. 11C, in which two or more actuators may be disposed to be adjacent to each other in the sound output area in order to generate a sound pressure more than a predetermined value, or an actuator that has a bobbin of non-circular shape (such as an oval bobbin) may be disposed.

For example, the left diagram of FIG. 11C shows two actuators 200-1 and 200-2 that are disposed to be horizontally adjacent to each other in the sound output area, and in this case, the sound waves (F) that proceed up and down have a greater amplitude than the sound waves (G) that proceed left and right.

Therefore, in this case, the upper and lower horizontal sides for which the strong sound waves (F) head may be defined as the first-sides 410, and the bent portions 412 may be formed therein.

In this case, two bent portions 412 that are formed in the upper and lower first-sides may be disposed such that the line connecting the two bent portions 412 passes through the center position of the two actuators 200-1 and 200-2. That is, end points of the bent portions 412 are directed to the center point between the two actuators 200-1 and 200-2.

With the example configuration described above, traveling waves heading for the first-sides among the traveling waves generated by two actuators are reflected to be dispersed left and right in order to thereby reduce the generation of the standing wave.

Meanwhile, the right diagram of FIG. 11C shows a non-circular actuator, such as an oval actuator, instead of a circular actuator. Although the bobbin of the actuator 200 may generally have a circular shape as described in FIGS. 5A-5B and the like, an oval bobbin may be used to increase the output of the actuator.

In the case of an oval actuator as described above, because a sound wave that proceeds in the short-axis direction of the ellipse of the actuator may be strong, two sides parallel to the long-axis of the ellipse may be defined as the first-sides 410, and the bent portions 412 may be formed in the first-sides 410 as shown in FIG. 11C. In this case, the end points of the bent portions 412 are directed to the center of the non-circular actuator 200.

Figure 12:
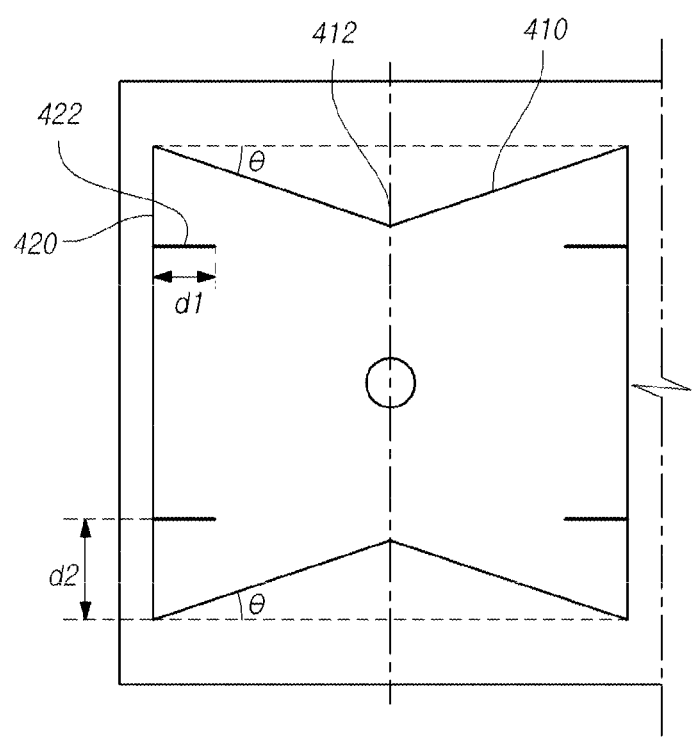
FIG. 12 illustrates a relationship between an inclination angle of the first side of the sound separating partition portion including a bent portion and the position and length of an additional confining member, according to an example of the present embodiment.

FIG. 12 illustrates a relationship between an inclination angle of the first-side of the sound separating partition portion including a bent portion, and the position and length of an additional confining member, according to an example of the present embodiment.

As shown in FIG. 12, the first-side 410 of the sound separating partition portion, in which the bent portion 412 is formed, is comprised of two straight lines that extend inwardly to have a constant inclination angle θ with respect to the horizontal direction or the vertical direction of the display panel, and the bent portion 412 is formed at the point where the two straight lines meet. The first-side 410 or the bent portion 412 is not limited to a linear shape, and may be curved shape or rounded shape.

In this example, as the inclination angle θ of the bent portion 412 increases, the dispersion characteristic of the reflection wave increases to further suppress the generation of the standing wave. However, as the inclination angle θ increases, the sound output area (that is, the size of the vibrating plate) is reduced so that the sound pressure may decrease and the frequency of the sound wave may vary.

Therefore, the inclination angle θ of the bent portion 412 may be configured to be variable in the range of about 10 to 30 degrees, depending on the required amount of suppression of the standing wave.

For example, when the sound output area is intended for a low-pitched sound or when the actuator has a large output, the inclination angle θ of the bent portion 412 may be large, whereas when the sound output area is intended for a middle/high-pitched sound or when the actuator has a small output, the inclination angle θ of the bent portion 412 may be small.

Also, the protruding confining portion 422 formed in the second-side 420 has the first length d1, and is disposed to be spaced apart by the second distance d2 from the end of the second-side 420.

In this case, although the standing wave suppression effect increases with an increase in the first length d1 of the protruding confining portion 422, the vibration characteristic of the vibrating plate may be degraded. Thus, the first length d1 of the protruding confining portion 422 may be adjusted according to the degree of generation of the standing wave or a required area of the vibrating plate.

For example, in the case of a high degree of generation of the standing wave, the first length d1 of the protruding confining portion 422 may be configured to be long, and in the case of a low degree of generation of the standing wave or in the case where a large area of the vibrating plate is required, the first length d1 of the protruding confining portion 422 may be configured to be short.

Also, two protruding confining portions 422 may be formed in the second-side 422, and may be symmetrically disposed based on the position of the actuator.

That is, as shown in the example of FIG. 12, in the case where one protruding confining portion 422 is disposed to be spaced apart by the second distance d2 from one end of the second-side, the other protruding confining portion may be disposed to be space apart by the same second distance d2 from the other end of the second-side.

Also, the first length d1 of the protruding confining portion 422 and the spaced distance (second distance) d2 of the protruding confining portion 422 from the edge may be configured to be proportional to the inclination angle θ of the bent portion 412 formed on the first-side.

That is, in the case of a large inclination angle θ of the bent portion 412 formed on the first-side 410, the intensity of the reflection wave that is reflected by the bent portion 412 and heads for the second-side 420 increases. Accordingly, the first length d1 of the protruding confining portion 422 or the spaced distance (second distance) d2 of the protruding confining portion 422 from one end of the second-side 420 may be increased to suppress the generation of the standing wave around the second-side 420.

Figure 13:
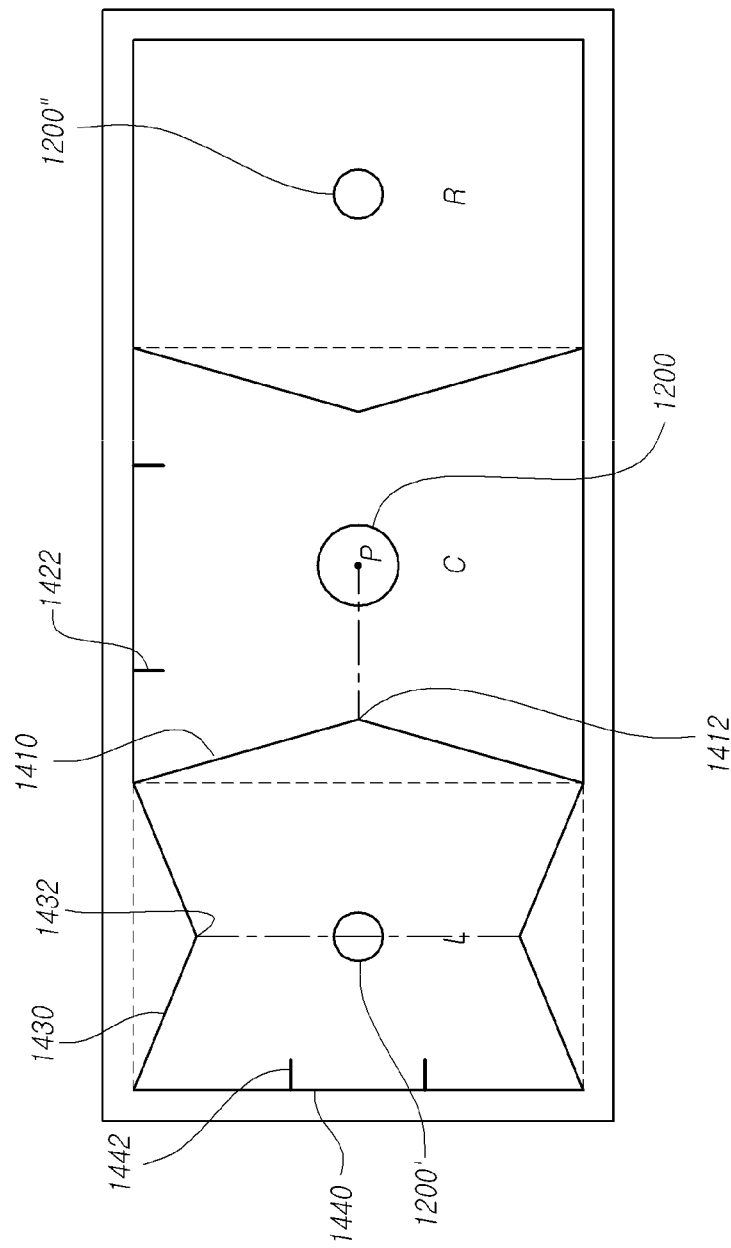
FIGS. 13 and 14 illustrate views that variously show the form of each area and the disposition of bent portions and additional confining portions according to the position and form of the sound generating actuator in the 2.1-channel system in which the sound output areas include the left and right areas for outputting a middle/high-pitched sound in the left and right and the central area for outputting a low-pitched sound.
Figure 14:
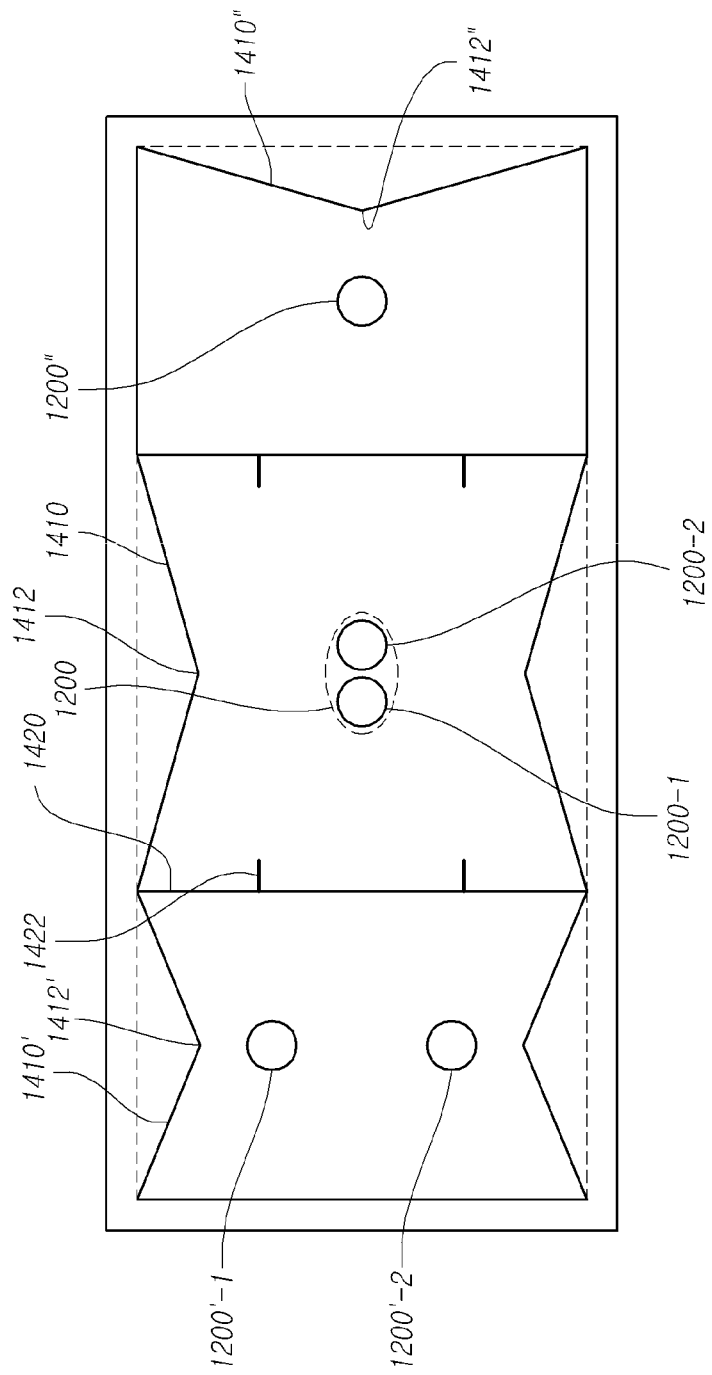

FIGS. 13 and 14 illustrate plan views of a display device, according to another example embodiment of the present disclosure, wherein a 2.1-channel system is shown. FIGS. 13 and 14 illustrate views that variously show the form of each sound output area and the disposition of bent portions and additional confining portions according to the position and form of the sound generating actuator in the 2.1-channel system, in which the sound output areas include the left and right areas for outputting a high/middle-pitched sound, and the central area for outputting a low-pitched sound.

In the example embodiment shown in FIG. 13, the sound output areas include the left area (L) and the right area (R) that are disposed in the left and right side of the display panel, respectively, in order to generate a high/middle-pitched sound, and the central area (C) that is disposed in the center of the display panel in order to generate a low-pitched sound.

As shown in FIG. 13, the central actuator 1200 directly vibrates the display panel of the central area (C) to generate a low-pitched sound, and the left and right actuators 1200' and 1200" directly vibrate the display panel portions of the left area (L) and the right area (R) to generate a middle/high-pitched sound.

That is, an example of the present embodiment may provide the so-called 2.1-channel type of sound output feature in which a low-pitched sound is output from the central woofer, and a left and right stereo sound is output from the left and right areas.

In this specification, a low-pitched sound may be defined in the range of less than 300 Hz, a middle-pitched sound may be defined in the range of 300 to 1.5 kHz, and a high-pitched sound may be defined in the range of more than 1.5 kHz, but definitions are not limited thereto.

Meanwhile, examples of the present embodiment may adopt one of either the first example configuration, in which the output of the central actuator 1200 is greater than the outputs of the left and right actuators 1200' and 1200", or the second example configuration, in which the central area (C) is larger than the left area (L) or the right area (R).

With the configuration described above, the low-pitched sound may be stronger than the middle/high-pitched sound in order to thereby improve the low-pitched sound characteristics.

For example, when the central area (C) is larger than the left/right area, the area of the vibrating plate for a low-pitched sound increases even with the same output of the actuators, so that a stable output for the low-pitched sound can be secured.

Meanwhile, bent portions 1412 that are bent toward the central actuator 1200 disposed in the central area (C) may be disposed in one or more first-sides 1410 among four sides of the sound separating partition portion 1400 that defines the central area (C).

Also, one or more protruding confining portions 1422 that protrude toward the central actuator 1200 may be disposed in one or more second-sides that are perpendicular to the first-sides 1410.

Also, a bent portion that is bent toward the left actuator 1200' or the right actuator 1200" that is positioned in the left area or right area may be disposed in at least one of three sides, except for the side 1410 that is shared by the sound separating partition portion of the central area (C), among four sides of the sound separating partition portion that defines the left area (L) or the right area (R).

In other words, as shown in the left area of FIG. 13, the left vertical side of the left area is shared by the central area (C) and plays the role of separating the central area (C) from the left area (L), and bent portions 1432 may be formed on the upper and lower sides 1430 of the left area that are perpendicular to the left vertical side such that the bent portions 1432 are directed to the center direction of the left actuator 1200'.

Also, one or more protruding confining portions 1442 may be formed on the right vertical side 1440 of the left area.

As will be described below, because a middle/high-pitched sound of the left or right area is barely influenced by the standing wave because its sound pressure is low, in comparison to a low-pitched sound of the central area, the bent portion and the protruding confining portion may not be formed in the left and right areas as shown in the right area of FIG. 13.

For example, in the configuration shown in FIG. 13, the standing wave generated in the central area is the greatest because the output of the central actuator 1200 for a low-pitched sound is larger.

That is, although the sound deterioration caused by the standing wave also occurs in the left area or right area, because the low-pitched sound wave of the central area has a long wavelength and a great amplitude, it is more significantly influenced by the standing wave.

Thus, by adopting the example configuration shown in FIG. 13, it may be possible to output a low-pitched sound and a stereo sound at the same time while minimizing the influence of a standing wave in the low sound band.

FIG. 14 shows another example embodiment of the 2.1-channel system in which the central actuator 1200 of the central area (C) is comprised of two central sub-actuators 1200-1 and 1200-2 that are horizontally disposed to be adjacent, and the left actuator of the left area is comprised of two left sub-actuators 1200'-1 and 1200'-2 that are vertically disposed to be spaced apart.

In this example, the upper and lower sides of the central area (C) are defined as the first-sides 1410, and bent portions 1412 are formed on the first-sides 1410 such that end points of the bent portions 1412 are directed to the center point between the two central sub-actuators 1200-1 and 1200-2.

Also, the protruding confining portions 1422 may be formed on the left and right second-sides 1420 of the central area so as to protrude toward the central actuator 1200.

Meanwhile, the upper and lower sides of the left area may be defined as the first-sides 1410', and the bent portions 1412' may be disposed in the first-sides 1410'.

In the structure shown in FIG. 14, because the left sub-actuators 1200'-1 and 1200'-2 are disposed to be adjacent to the upper and lower sides of the left area, the generation of the standing wave may increase in the upper and lower sides. Therefore, as shown in the left area of FIG. 14, the bent portions 1412' are formed on the upper and lower sides of the left area in order to thereby suppress the generation of the standing wave in the left area to a minimum.

In the case where a single right actuator 1200" is disposed as shown in the right area of FIG. 14, the left vertical side of the right area may be defined as the first-side 1410", and a bent portion 1412" that is bent to the right actuator may be formed only on the first-side 1410".

As described above, the example embodiments of the present disclosure may give an effect of providing the panel vibration type of sound generating display device that generates a sound by directly vibrating the display panel, and include the sound separating partition portion for defining a plurality of sound output areas that output different sounds, respectively, in order to thereby secure an excellent sound separation characteristic.

Also, it may be possible to suppress the sound pressure reduction caused by the standing wave that is generated by the interference between a reflection wave and a traveling wave by forming a bent portion that is bent toward the sound generating actuator in at least one of the sides of the sound separating partition portion that defines a plurality of sound output areas.

In addition to the bent portion, one or more protruding confining portions may be formed in at least one (the second-side) of the sides of the sound separating partition portion in order to thereby further suppress the sound pressure reduction caused by the standing wave that is generated by the interference between a reflection wave and a traveling wave.

Furthermore, as a plurality of sound output areas, one of either the 2-channel system that includes left and right areas for outputting a left and right stereo sound, or the 2.1-channel system that further includes a central area for outputting a low-pitched sound in addition to the same may be selected, a bent portion that is bent toward the sound generating actuator may be formed in at least one of four sides that constitute the sound separating partition portion of each area, and a protruding confining portion may be formed in at least one of the remaining sides, thereby minimizing the sound pressure reduction caused by the standing wave while providing an excellent sound separation characteristic.

As a result, it may be possible to improve a sound device of the display device by suppressing the sound pressure reduction caused by the standing wave while securing an excellent sound separation characteristic in the display device for outputting a 2-channel or 2.1-channel sound by means of the panel vibration.

According to one or more example embodiments of the present disclosure, a panel vibration type of sound generating display device includes a display panel for displaying images, a plurality of sound generating actuators configured to be disposed in a plurality of sound output areas for outputting different sounds, respectively, within the display device, and configured to vibrate the display panel and generate a sound, a back support portion for supporting the back portion of the display panel, and a sound separating partition portion that surrounds each of the plurality of sound output areas, and configured to be disposed in contact with the display panel and the back support portion to define a space in each of the sound output areas.

According to one or more embodiments of the present disclosure, the sound separating partition portion may be comprised of four sides that surround each of the sound output areas, and one or more first-sides among the four sides of the sound separating partition portion may include a bent portion that is bent toward the sound generating actuator that is disposed in the corresponding area.

According to one or more embodiments of the present disclosure, an end point of the bent portion may be directed to the center of the sound generating actuator.

According to one or more embodiments of the present disclosure, a second-side that is disposed to be perpendicular to the first-side may further include a protruding confining portion that protrudes toward the sound generating actuator that is disposed in the corresponding area.

According to one or more embodiments of the present disclosure, sound waves generated by the sound generating actuator may have an asymmetric radiation characteristic, and the first-side may be comprised of one side or two sides for which a strong sound wave among the sound waves heads.

According to one or more embodiments of the present disclosure, the sound generating actuator may be disposed in an asymmetric position in the corresponding sound output area, and the first-side may be the side that is closest to the sound generating actuator.

According to one or more embodiments of the present disclosure, the display device may further include two protruding confining that are disposed on the second-side to be spaced apart from each other.

According to one or more embodiments of the present disclosure, the sound output areas may include a left area and a right area that are formed in the left side and the right side of the display panel.

According to one or more embodiments of the present disclosure, the sound output areas may include a left and a right area that are disposed in the left and right sides of the display panel, respectively, in order to output a middle/high-pitched sound, and a central area that is disposed in the center of the display panel in order to output a low-pitched sound.

According to one or more embodiments of the present disclosure, the central area may be greater than the left area or the right area.

According to one or more embodiments of the present disclosure, a bent portion that is bent toward the central actuator that is positioned in the central area may be disposed in one or more first-sides among four sides of the sound separating partition that defines the central area, and a protruding confining portion that protrudes toward the central actuator may be disposed in one or more of the second-sides that are perpendicular to the first-sides.

According to one or more embodiments of the present disclosure, a bent portion that is bent toward the left actuator or the right actuator that is positioned in the left area or the right area may be disposed in at least one of three sides, except for the side that is shared by the sound separating partition portion of the central area, among four sides of the sound separating partition portion that defines the left area or the right area.

According to one or more embodiments of the present disclosure, the sound separating partition may include an adhesive member that is bonded to the upper surface of the back support portion and to the lower surface of the display panel, and a sealing portion that is disposed in the outside of the adhesive member. The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

According to one or more example embodiments of the present disclosure, a display device includes a display panel configured to display images, a plurality of sound generating actuators in a plurality of sound output areas, the sound generating actuators configured to vibrate the display panel to generate sound, and a partition that is between each of the plurality of sound output areas and surrounds at least one of the plurality of sound output areas.

According to one or more example embodiments of the present disclosure, the plurality of sound generating actuators respectively may output different sounds within the display device.

According to one or more example embodiments of the present disclosure, the display device may further include a back support portion configured to support the display panel.

According to one or more example embodiments of the present disclosure, the sound separating partition may be in contact with the display panel and the back support portion to define a space in each of the sound output areas.

According to one or more example embodiments of the present disclosure, the partition may separate sound between each of the plurality of sound output areas.

According to one or more example embodiments of the present disclosure, the partition may surround each of the plurality of sound output areas.

According to one or more example embodiments of the present disclosure, the partition may be comprised of four sides that surround each of the sound output areas, and one or more first-sides among the four sides of the partition may include a bent portion that is bent toward the sound generating actuator in the corresponding sound output area.

According to one or more example embodiments of the present disclosure, a vertex of the bent portion may be directed to a center of the sound generating actuator.

According to one or more example embodiments of the present disclosure, a second-side that is perpendicular to the first-side may further include a protruding confining portion that protrudes toward the sound generating actuator in the corresponding sound output area.

According to one or more example embodiments of the present disclosure, sound waves generated by the sound generating actuator may have an asymmetric radiation characteristic, and the first-side may be comprised of one side or two sides for which a stronger than average sound wave among the sound waves is directed by the sound generating actuator.

According to one or more example embodiments of the present disclosure, the sound generating actuator may be in an asymmetric position in the corresponding sound output area, and the second-side may be the one of the four sides that is closest to the sound generating actuator.

According to one or more example embodiments of the present disclosure, the display device may further include two protruding confining portions on the second-side and spaced apart from each other.

According to one or more example embodiments of the present disclosure, the sound output areas may include a first area and a second area to output a stereo sound.

According to one or more example embodiments of the present disclosure, the sound output areas may include a first area and a second area to output at least one of a middle and high-pitched sound, and the sound output areas may include a third area between the first area and the second area to output a low-pitched sound.

According to one or more example embodiments of the present disclosure, the third area may be greater in size than the first area or the second area.

According to one or more example embodiments of the present disclosure, a bent portion that is bent toward an actuator in the third area may be in one or more first-sides among four sides of the partition that defines the third area, and a protruding confining portion that protrudes toward the actuator may be in one or more second-sides that are perpendicular to the first-sides.

According to one or more example embodiments of the present disclosure, a bent portion that is bent toward an actuator in the first area or the second area may be in at least one of three sides other than a side that is shared by the sound separating partition of the third area, among four sides of the partition that defines the first area or the second area.

According to one or more example embodiments of the present disclosure, the partition may comprise one or both of an adhesive member bonded to the upper surface of the back support portion and to the lower surface of the display panel, and a sealing portion between the upper surface of the back support portion and the lower surface of the display panel.

According to one or more example embodiments of the present disclosure, the sound generating actuator may comprise a lower plate, a magnet on the lower plate, a center pole at the center of the lower plate, a bobbin surrounding the center pole, and a coil wound around the bobbin.

According to one or more example embodiments of the present disclosure, a display device includes a display panel configured to display images, a plurality of areas behind the display panel and separated by a partition, and a plurality of sound generating actuators in the plurality of areas, the sound generating actuators configured to vibrate the display panel to generate sound, at least one of the areas includes two or more of the sound generating actuators.

According to one or more example embodiments of the present disclosure, an apparatus includes a display panel configured to display images, a plurality of areas behind the display panel and separated by a partition, and a first sound generating actuator in a first of the plurality of areas, the first sound generation actuator configured to vibrate the display panel to generate sound, a second of the plurality of areas does not include a sound generating actuator.

According to one or more example embodiments of the present disclosure, the apparatus may further include a second sound generating actuator in a third of the plurality of areas, the second sound generating actuator configured to vibrate the display panel to generate sound.

According to one or more example embodiments of the present disclosure, the second area may be between the first area and the third area.

According to one or more example embodiments of the present disclosure, at least one of the first area and the third area may include two or more sound generating actuators configured to vibrate the display panel to generate sound.

According to one or more example embodiments of the present disclosure, the partition may include a first-side having a bent portion that is bent toward a center point between the two or more sound generating actuators.

According to one or more example embodiments of the present disclosure, the apparatus may further include a back support portion behind the display panel, the partition between the display panel and the back support portion to define the plurality of areas.

According to one or more example embodiments of the present disclosure, the partition may include at least one of a first-side having a bent portion that is bent toward a sound generating actuator, and a second-side having a protruding confining portion that protrudes toward the sound generating actuator.

According to one or more example embodiments of the present disclosure, the partition may include both of the first-side and the second-side, the first-side being perpendicular to the second-side.

According to one or more example embodiments of the present disclosure, the partition may include the second-side, the second-side may include two protruding confining portions spaced apart from each other.

Configurations in accordance with embodiments of the present disclosure may provide a number of attributes. For example, a display device may generate a sound by directly vibrating a display panel that constitutes the display device, and includes a sound separating partition portion configured to define a plurality of sound output areas that output different sounds, respectively.

Further, a panel vibration type of sound generating display device may include a bent portion that is bent toward the sound generating actuator is formed on at least one of the sides of the sound separating partition portion that defines a plurality of sound output areas in order to thereby suppress the sound pressure reduction caused by a standing wave that is generated by the interference between a reflection wave and a traveling wave.

Additionally, a panel vibration type of sound generating display device may include one or more protruding confining portions formed in at least one of the sides of the sound separating partition portion in order to thereby suppress the sound pressure reduction caused by a standing wave that is generated by the interference between a reflection wave and a traveling wave.

Furthermore, a panel vibration type of sound generating display device may select, as a plurality of sound output areas, one of either a 2-channel system that includes left and right areas for outputting a left and right stereo sound or a 2.1-channel system that further includes a central area for outputting a low-pitched sound in addition to the same, wherein a bent portion that is bent toward the sound generating actuator is formed in at least one of four sides that constitute each area and a protruding confining portion is disposed in at least one of the remaining sides in order to thereby reduce the sound pressure reduction caused by a standing wave while providing an excellent sound separation characteristic.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. A display device, comprising:
   a display panel configured to display images by emitting light;
   a plurality of sound generating actuators in a plurality of sound output areas, the sound generating actuators configured to vibrate the display panel to generate sound; and
   a partition that is between each of the plurality of sound output areas and surrounds at least one sound output area of the plurality of sound output areas,
   wherein the partition is comprised of four sides that surround each of the sound output areas,
   wherein at least one side of the four sides includes a protruding confining portion to avoid reduction in sound pressure caused by a standing wave, and
   wherein the protruding confining portion protrudes toward the sound generating actuator in the corresponding sound output area.

2. The display device according to claim 1, wherein the plurality of sound generating actuators respectively output different sounds within the display device.

3. The display device according to claim 1, further comprising:
   a back support portion configured to support the display panel.

4. The display device according to claim 3, wherein the partition comprises:
   one or both of an adhesive member bonded to an upper surface of the back support portion and to a lower surface of the display panel, and a sealing portion between the upper surface of the back support portion and the lower surface of the display panel.

5. The display device according to claim 3, wherein the partition is in contact with the display panel and the back support portion to define a space in each of the sound output areas.

6. The display device according to claim 1, wherein the partition separates sound between each of the plurality of sound output areas.

7. The display device according to claim 1, wherein the partition surrounds each of the plurality of sound output areas.

8. The display device according to claim 1, one or more first-sides among the four sides of the partition includes a bent portion that is bent toward the sound generating actuator in the corresponding sound output area.

9. The display device according to claim 8, wherein a vertex of the bent portion is directed to a center of the sound generating actuator.

10. The display device according to claim 8, wherein the at least one side is a second-side that is perpendicular to the one or more first-sides, and the standing wave is generated by interference between a traveling wave and a reflection wave that is reflected by the partition among sound waves that are generated by the sound generating actuator in the corresponding sound output area.

11. The display device according to claim 10, wherein the sound waves generated by the sound generating actuator have an asymmetric radiation characteristic, and the one or more first-sides are comprised of one side or two sides of the four sides for which a stronger than an average sound wave among the sound waves is directed by the sound generating actuator.

12. The display device according to claim 10, wherein the sound generating actuator is in an asymmetric position in the corresponding sound output area, and the second-side is one of the four sides that is closest to the sound generating actuator.

13. The display device according to claim 12, further comprising two protruding confining portions on the second-side and spaced apart from each other.

14. The display device according to claim 1, wherein the sound output areas include a first area and a second area to output a stereo sound.

15. The display device according to claim 1,
    wherein the sound output areas include a first area and a second area to output at least one of a middle and high-pitched sounds; and
    wherein the sound output areas include a third area between the first area and the second area to output a low-pitched sound.

16. The display device according to claim 15, wherein the third area is greater in size than the first area or the second area.

17. The display device according to claim 16, wherein a bent portion that is bent toward an actuator in the third area is in one or more first-sides among four sides of the partition that defines the third area, and the protruding confining portion that protrudes toward the actuator is in one or more second-sides that are perpendicular to the one or more first-sides.

18. The display device according to claim 17, wherein a bent portion that is bent toward an actuator in the first area or the second area is in at least one of three sides other than a side that is shared by the partition of the third area, among the four sides of the partition that defines the first area or the second area.

19. The display device according to claim 1, wherein the sound generating actuator comprises:
    a lower plate;
    a magnet on the lower plate;
    a center pole at a center of the lower plate;
    a bobbin surrounding the center pole; and
    a coil wound around the bobbin.

20. The display device according to claim 1, wherein the display panel is one of an organic light emitting diode display panel, a plasma display panel, and a liquid crystal display panel.

21. A display device, comprising:
    a display panel configured to display images by emitting light;
    a plurality of areas behind the display panel and separated by a partition; and
    a plurality of sound generating actuators in the plurality of areas, the sound generating actuators configured to vibrate the display panel to generate sound,
    wherein at least one area of the areas includes two or more sound generating actuators of the sound generating actuators,
    wherein the partition is comprised of four sides that surround each of the areas,
    wherein at least one side of the four sides includes a protruding confining portion to avoid reduction in sound pressure caused by a standing wave, and
    wherein the protruding confining portion protrudes toward the sound generating actuator in the corresponding area.

22. An apparatus, comprising:
a display panel configured to display images by emitting light;
a plurality of areas behind the display panel and separated by a partition; and
a first sound generating actuator in a first area of the plurality of areas, the first sound generating actuator configured to vibrate the display panel to generate sound,
wherein a second area of the plurality of areas does not include a sound generating actuator,
wherein the partition is comprised of four sides that surround the first area of the plurality of areas,
wherein at least one of the four sides includes a protruding confining portion to avoid reduction in sound pressure caused by a standing wave, and
wherein the protruding confining portion protrudes toward the sound generating actuator in the corresponding area.

23. The apparatus according to claim 22, further comprising:
a second sound generating actuator in a third area of the plurality of areas, the second sound generating actuator configured to vibrate the display panel to generate sound.

24. The apparatus according to claim 23, wherein the second area is between the first area and the third area.

25. The apparatus according to claim 24, wherein at least one of the first area and the third area includes two or more sound generating actuators configured to vibrate the display panel to generate sound.

26. The apparatus according to claim 25, wherein:
the partition includes a first-side having a bent portion that is bent toward a center point between the two or more sound generating actuators.

27. The apparatus according to claim 22, further comprising:
a back support portion behind the display panel, the partition between the display panel and the back support portion to define the plurality of areas.

28. The apparatus according to claim 22, wherein the partition includes a first-side having a bent portion that is bent toward a sound generating actuator, and
a second-side having the protruding confining portion that protrudes toward the sound generating actuator, wherein the at least one side is the second-side.

29. The apparatus according to claim 28, wherein the first-side is perpendicular to the second-side.

30. The apparatus according to claim 28, wherein:
the second-side includes two protruding confining portions spaced apart from each other.

* * * * *